United States Patent [19]

Nakajima

[11] Patent Number: 5,625,466
[45] Date of Patent: Apr. 29, 1997

[54] IMAGE FORMING APPARATUS PROVIDING LANDSCAPE OR PORTRAIT IMAGE FORMAT BASED ON DETECTED SIZE OF ORIGINAL

[75] Inventor: Akio Nakajima, Toyokawa, Japan

[73] Assignee: Minolta Co., Ltd., Osaka, Japan

[21] Appl. No.: 358,733

[22] Filed: Dec. 19, 1994

[30] Foreign Application Priority Data

Mar. 4, 1994 [JP] Japan .................................. 6-034575

[51] Int. Cl.⁶ .................................................. H04N 1/387
[52] U.S. Cl. .......................... 358/449; 358/488; 358/296; 382/297
[58] Field of Search .................... 358/296, 401, 358/406, 434, 449, 451, 474, 486, 488, 497, 498; 355/204, 206, 208, 233, 40, 77; 382/296, 297

[56] References Cited

U.S. PATENT DOCUMENTS

| | | | |
|---|---|---|---|
| 4,843,405 | 6/1989 | Morikawa et al. | 358/296 |
| 4,912,518 | 3/1990 | Matsuo et al. | 355/317 |
| 5,214,519 | 5/1993 | Faulhaber et al. | 358/451 |
| 5,220,431 | 6/1993 | Yamagguchi | 358/296 |
| 5,301,036 | 4/1994 | Barrett et al. | 358/401 |
| 5,321,486 | 6/1994 | Nanbu et al. | 355/311 |
| 5,327,261 | 7/1994 | Hirota et al. | 358/449 |
| 5,519,483 | 5/1996 | Kawanishi et al. | 358/474 |

FOREIGN PATENT DOCUMENTS

| | | |
|---|---|---|
| 54-74441 | 6/1979 | Japan . |
| 1-220970 | 9/1989 | Japan . |
| 3-233578 | 10/1991 | Japan . |

*Primary Examiner*—Peter S. Wong
*Assistant Examiner*—Derek J. Jardieu
*Attorney, Agent, or Firm*—Sidley & Austin

[57] ABSTRACT

In a digital copying machine, a document image is read and the document image is reproduced on a paper. If a document has a size which does not limit a direction of document on a platen For reading the document image, the document type of portrait or landscape is decided according to the direction of document on the platen. If a user sets a document type, the setting by the user may have priority than the decision according to the document direction. If a document has a size which can be set only along a specified direction for reading the document image, it is requested for a user to set the document direction (portrait document or a landscape document). Then, for example, a margin can be set suitably according to the document type.

18 Claims, 29 Drawing Sheets

Front side
(User)

Front side
(User)

Input image

Output image

Input image

Output image

ID=5,625,466

IMAGE FORMING APPARATUS PROVIDING LANDSCAPE OR PORTRAIT IMAGE FORMAT BASED ON DETECTED SIZE OF ORIGINAL

BACKGROUND OF THE INVENTION

1. Field of the Invention

The present invention relates to an image forming apparatus such as a digital copying machine.

2. Description of the Prior Art

In a digital copying machine, a document image is read by a sensor and is stored in a memory. Then, the image data stored in the memory can be processed in various ways. For example, a plurality of the same document image can be reproduced by reading the image data iteratively. It is possible to scale up and down the document image by processing the image data. It is also possible to rotate the document image. Then, a digital copying machine has various modes.

For example, a margin can be set for providing a margin at a specified position on a copy paper (refer for example Japanese Patent laid open Publication 54-74441/1979). A margin may be provided, for example, at a top side and at a left side of document images. Usually, a user can specify a margin position by using an operational panel.

The position of margin depends on a type of document such as a portrait document or a landscape document. A landscape document has an image which a person can observe normally if it is placed with its longer side before the person. On the other hand, a portrait document has an image which a person can see normally if it is placed with its shorter side before the person. Usually, a person accesses a copying machine before a longer side of a platen thereof, and an automatic document feeder placed above the platen has its longer side before the person.

Then, it is possible for a user to place portrait and landscape documents at specified image positions. For example, if a document is placed onto the platen with its longitudinal direction in parallel to the document feed direction, the document is assumed to be a portrait document, while if a document is placed onto the platen with its longitudinal direction perpendicular to the document feed direction, the document is assumed to be a landscape document. Then, a margin is set at a position specified by a user for example at a top position.

An N-in-1 mode is also known that a synthesized image of a plurality of documents with a number of N is formed on a single sheet of paper (refer to for example U.S. Pat. No. 4,912,518). For example, in 4-in-1 mode, four document images are synthesized on a sheet of paper. Usually, the arrangement of four landscape documents in a synthesized image depends on the document type, that is, landscape and portrait. If the document type can be determined according to the document direction on the platen as explained above, it is possible that a plurality of document pages can be synthesized correctly in a single sheet of paper according to the document direction on the platen.

However, it is not possible for a copying machine to set documents of all sizes on the platen along the two directions. For example, if a document size is the largest size say A3 which can be dealt by a copying machine, documents of A3 and B4 sizes can be set only with their longitudinal direction in parallel to the document feed direction. That is, a document occupying more than a half of image read area in the platen can be placed only along a specified direction. On the other hand, if the smallest size of document which can be fed by an automatic document feeder is A5 size, an A5 document can be fed onto the platen only along a longitudinal direction of the document because an A5 size document cannot be carried normally by rollers when it is fed. In such cases, the position of margins may not be set correctly according to the document type and document direction on the platen. Further, a plurality of pages may not be synthesized correctly on a sheet of paper in N-in-1 mode.

SUMMARY OF THE INVENTION

An object of the present invention is to provide a an image forming apparatus which can perform suitable processing according to document types.

In an aspect of an image forming apparatus of the invention, a document image is read on a platen. A size of a document placed on a platen is detected, and it is decided if the document size allows the document to be placed on the platen only along a specified direction or the document size does not limit the document to be placed on the platen only along the specified direction. If the document has a size which does not limit a direction of document on a platen for reading the image, a document type of portrait or landscape is decided according to the direction of document on the platen. If the document has a size which can be set only along a specified direction for reading the document image, it is warned to a user that the document has a size which can be set only along a specified direction. It may be requested to a user to set the document direction (portrait document or a landscape document). Then, a margin can be set suitably according to the document type.

An advantage of the present invention of an image forming apparatus is that image processing can be performed according to correct document type.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
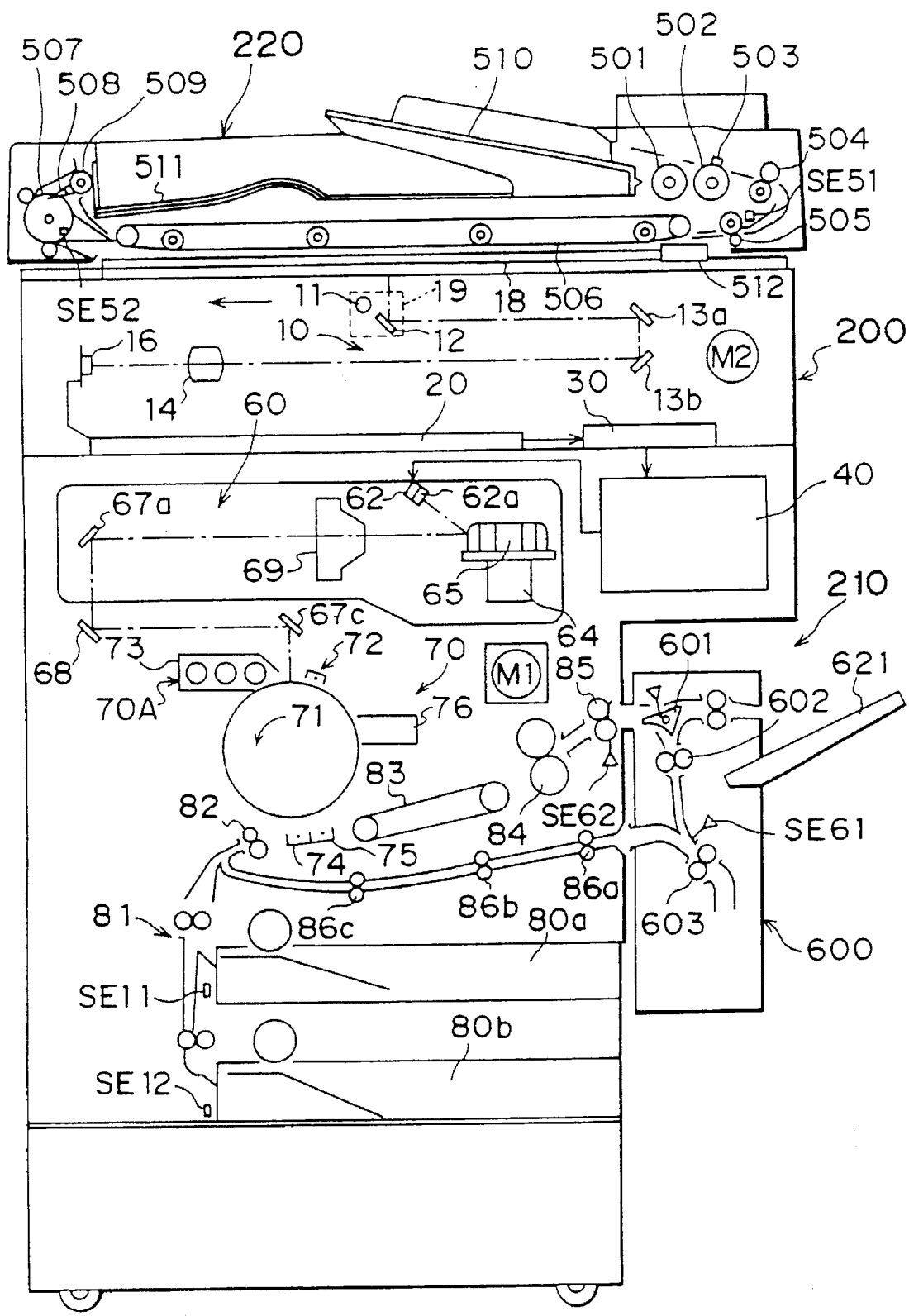
FIG. 1 is a sectional view of a copying machine of an embodiment of the invention.

Referring now to the drawings, wherein like reference characters designate like or corresponding parts throughout the several views, embodiments of the present invention are explained.

(1) Structure of digital copying machine

FIG. 1 shows a digital copying machine which comprises an image reader 200, a printer 210 and a document feeder 220. The image reader 200 comprises a scan system 10 which reads a document to convert optical signals thereof to image signals and an image signal processor 20 for processing the image signals received from the scan system 10. A exposure lamp 11 and a first mirror 12 are fixed to a first slider 19 which moves below a platen 18. Mirrors 13a and 13b are also fixed to a second slider (not shown) which also moves below the platen 18. A scan motor M2 drives the sliders. A light illuminated by the exposure lamp 11 is reflected from the document and reflected further by the mirrors 12, 13a and 13b. Then, the reflected light is transmitted through a lens 14 to be focused on an photoelectric device 16 having linear CCD sensors or the like. The device 16 converts an image to electric signals. The image signal processor 20 processes the image signals received from the photoelectric converter 16 and send image data to a memory unit 30 which will be explained later.

The printer 210 comprises a print processor 40 for driving a laser diode 62 according to the image data, an optical system for exposing a photoconductor drum 71 with a laser beam of the laser diode 62 and an image forming system for developing a latent image formed on the photoconductor drum 7 and forming the image on a paper. The print processor 40 provides signals to the laser diode 62 in the optical system 60. The laser diode 62 modulates a beam according to the signals, and the beam is reflected by a polygon mirror 65, passes a lens 66 and reflected further by mirrors 67a, 68 and 67c to expose the photoconductor drum 71. Thus, a latent image is formed on a photoconductor drum 71 in the image forming system.

In the image forming system, a first sensitizing charger 72a, a development unit 73a, a transfer charger 74, a separation charger 75 and a cleaning unit 76 are arranged around the photoconductor drum 71. The development unit 73 includes a two-component development material of toners and carriers. The latent image on the photoconductor drum 71 is developed by the development unit 73. On the other hand, a plurality of papers are installed in a cassette 80a or 80b, and one of them is carried through a guide 81 to a timing roller 82. A size of a carried paper is detected by a sensor SE11 or SE12. Then, it is carried at an appropriate timing toward the photoconductor drum 71 and the toner image is transferred by the transfer charger 74 on the papers and is separated by the separation charger 75 from the photoconductor drum 71. It is carried further by a conveying belt 83 to fixing rollers 84 which fixed the toner image on the paper. Then, the fixed paper is discharged by rollers 85 through a re-carriage system 600 onto a discharge tray 621. The discharge is detected by a sensor SE62.

The re-carriage system 600 is provided for carrying back a paper discharged by the rollers 85 to the timing roller 82. In two-face copy mode where images are formed on two faces of a paper, a face of the discharged paper is reversed and carried back to the timing roller 82, and another image is formed on a back face of the paper. A claw 601 is moved upside and a discharged paper is guided towards rollers 602. Then, the paper is carried by the rollers 602 and reverse rollers 603. If a bottom end of the paper is detected by a sensor SE61, the reverse rollers 603 are reversed and the paper is guided through the rollers 86a, 86b and 86c to the timing roller 82.

The document feeder 500 feed documents set on a document tray 510 one by one onto the platen 18 and discharge the document after it is read by the image reader 200. In a single face document mode, documents stacked on the tray 510 are carried one by one from a document located at the bottom among the documents by rollers 501, 502 and 504 and a timing roller 505 and is located on the platen 18 precisely. A length of the document is detected by sensors SE51. Then, the document on the platen 18 is read by the image reader 200. After the document is read, it is carried by a conveyer belt 506 towards left and carried reversely by a roller 507, guided by a claw 508 and discharged by a roller 509 onto a tray 511 with its face up.

In a two-face document mode, an image on a front face of a document located on the platen 18 is read as explained above in the single-face mode. The claw 508 is moved upward while the image on a front face is read. After the front face of the document is read, it is carried by the roller 507 and guided below the claw 508 towards the platen 18 reversely. The scanner 19 moves left and stops at an appropriate position for reading the back face in correspondence to the length of the document. This position is a little right from a position where the top of the document after the reversal and the bottom before it agree with each other. If the length a document is too short, the left side of the platen 18 is set as the position. The document length has been detected by the sensors SE51 while the document is feed. Then, the document is carried by the conveyer belt 506 left at a constant speed in correspondence to the magnification power while the back face of the document is read at the above-mentioned position by the image reader 200. The claw 508 is moved downward. After the back face is read, a moving direction of the conveyer belt 506 is reversed again, and the document is carried and discharged by the rollers 507 and 509 onto the tray 511 with its front face up.

Figure 2:
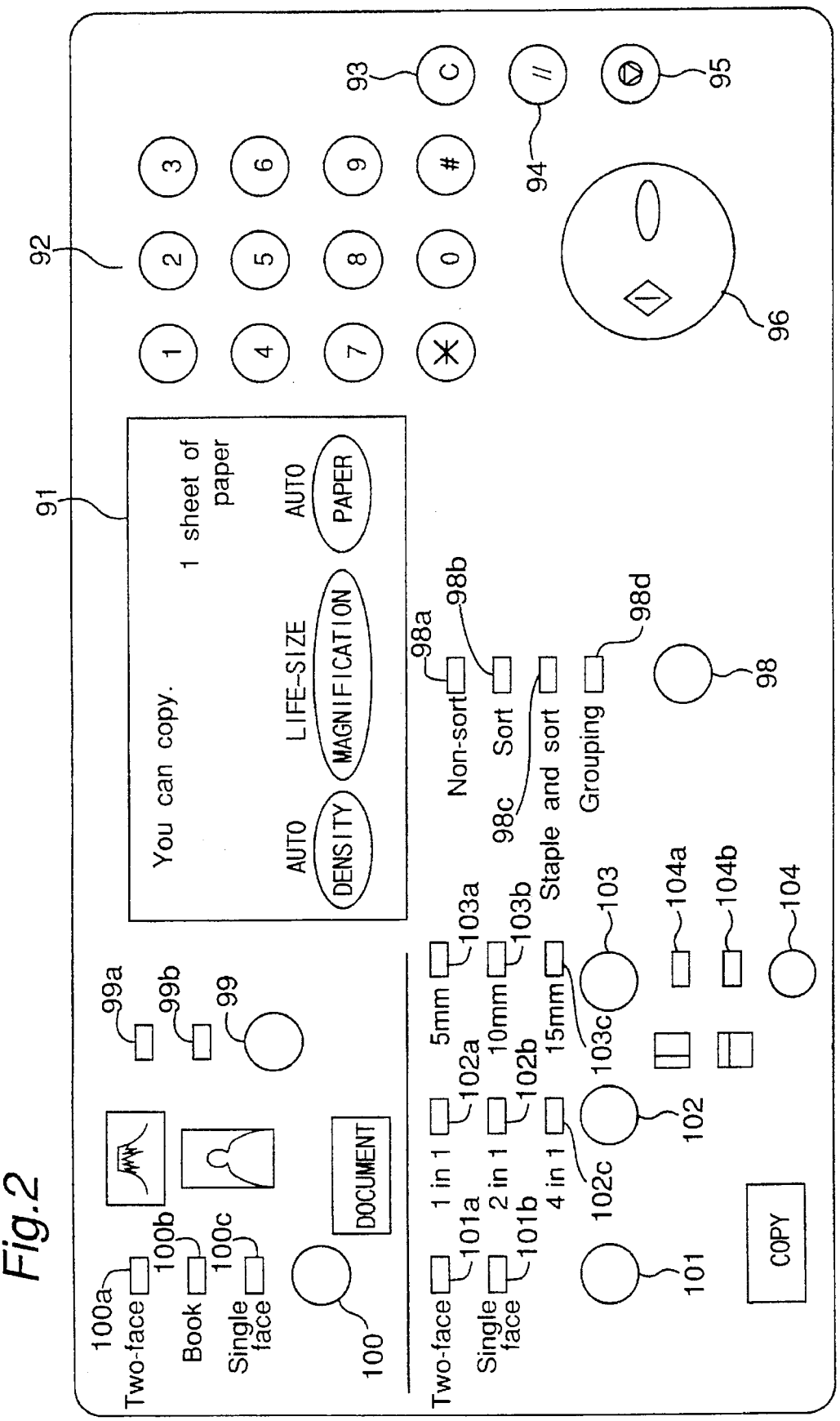
FIG. 2 is a plan view of an operational panel.

FIG. 2 shows an operational panel 90 of the digital copying machine, and it has a liquid crystal touch panel 91, various keys 92–96, 98–104 and light-emitting diode (LED) displays 98a, 98b, 98c, 98d, 99a, 99b, 100a, 100b, 100c, 101a, 101b, 102a, 102b, 102c, 103a, 103b, 103c, 104a and 104b. Ten-keys 92 are used to set a number of papers to be copied for a document or a magnification power for copy. A clear key 93 is used to set a number such as "1". A reset key 94 is used to return to standard conditions. A stop key 95 is used to stop copy operation. A start key 96 is used to start copy operation. A key 98 is used to select finish mode such as non-sort mode, sort mode, staple mode and grouping. A key 99 is used to select a document type such as a portrait document or a landscape document. A key 100 is used to select if a document is a single-face document, a double-face document or a book. A copy mode key 101 is used to select two-face copy mode or single-face copy mode. An N-in-1 key 102 is used select 1-in-1 mode (normal copy mode), 2-in-1 mode or 4-in-1 mode. A margin width key 103 is used to set a document width of 5, 10 or 15 mm. A document direction key 104 is used to select document direction of portrait or landscape.

The touch panel 91 displays various statuses such as jam, serviceman call, paper empty and the like, various modes on exposure level, magnification power, paper size and the like and receives touch-inputs for mode selection.

Figure 3A:
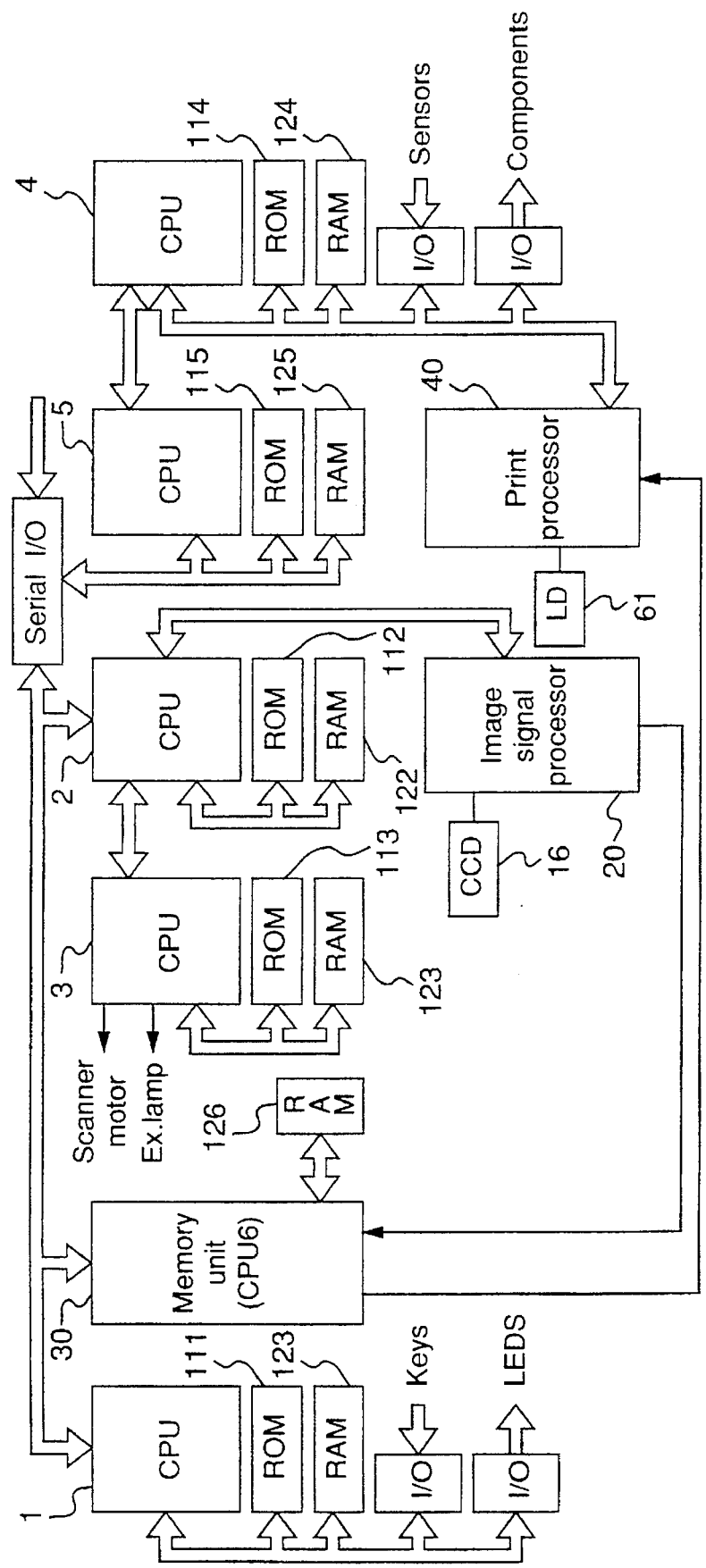
FIGS. 3A and 3B are a block diagram of a control section of the copying machine.
Figure 3B:
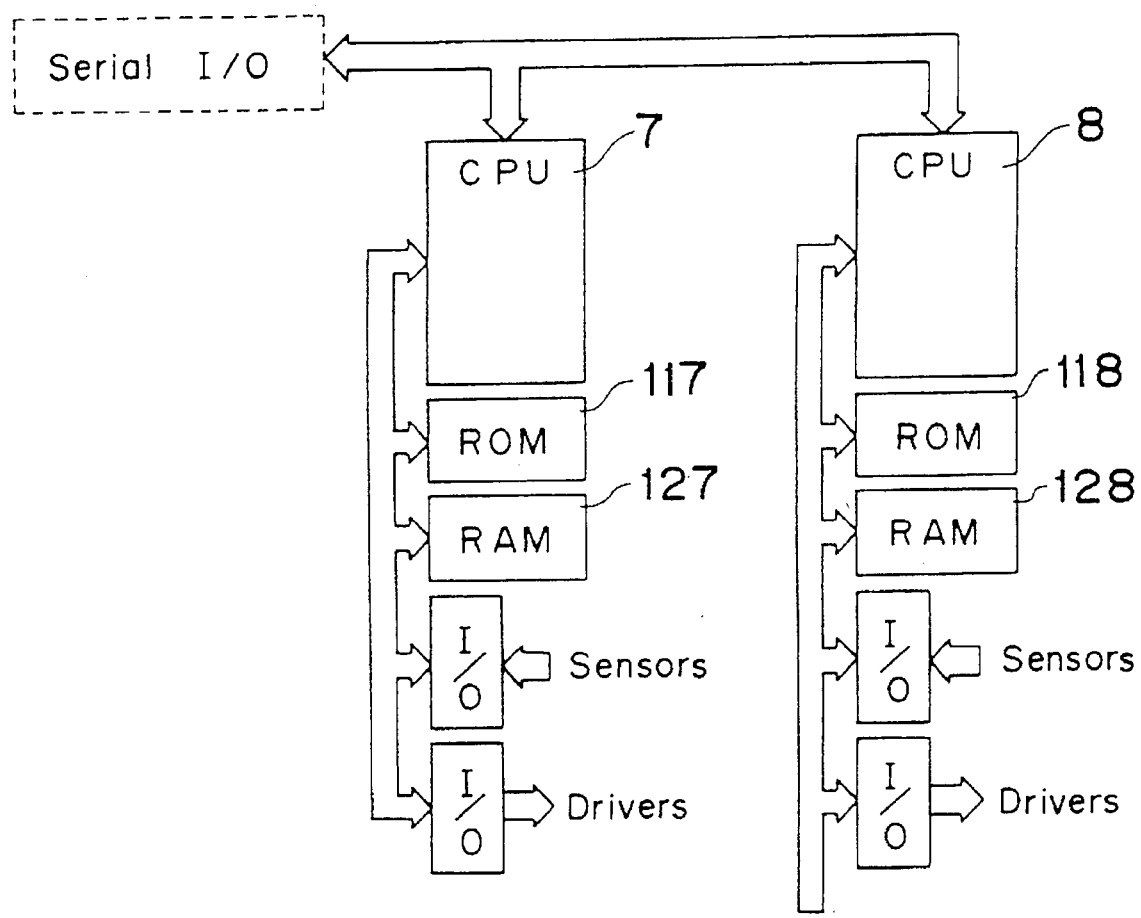

FIGS. 3A and 3B show a block diagram of a control section 100 of the copying machine 1. The controller 100 consists of eight central processing units (CPUs) 1–8, each of which is connected to a read only memory (ROM) 111–118 storing programs and a random access memory (RAM) 121–128 used as a work area. The CPU 6 is provided in a memory unit 30.

The CPU 1 controls key-input signals from the operational panel 90 and displays therein. The CPU 2 controls the image signal processor 20. The CPU 3 controls the scan system 10. The CPU 4 controls the print processor 40, the optical system 60 and the image forming system 70. Especially, the CPU 4 manages the size of a copy paper according to signals from the sensors SE11 and SE 12. The CPU 5 processes timing control and mode setting of the entire controller 100. The CPU 6 controls the memory unit 30 to store image data in an image memory 304 and to send them to the print system 40. The CPU 7 controls the document feeder 500. The CPU 8 controls the re-feed system 600. The CPUs 1–8 communicate commands, reports, data and the like with each other by using interrupts.

In the image signal processor 20 controlled by the CPU 2, an image signal received from the photoelectric converter 16 is converted by an A/D converter to a 8-bit image data for each pixel and the data is corrected for shading correction. Further, the data is processed if a magnification power is specified. Then, the image data is corrected for smoothing, edge emphasis and the like. Finally, image data D2 are supplied, and a 1-bit color data DC is also supplied for each pixel for representing if the color is a specified color or not.

Figure 4:
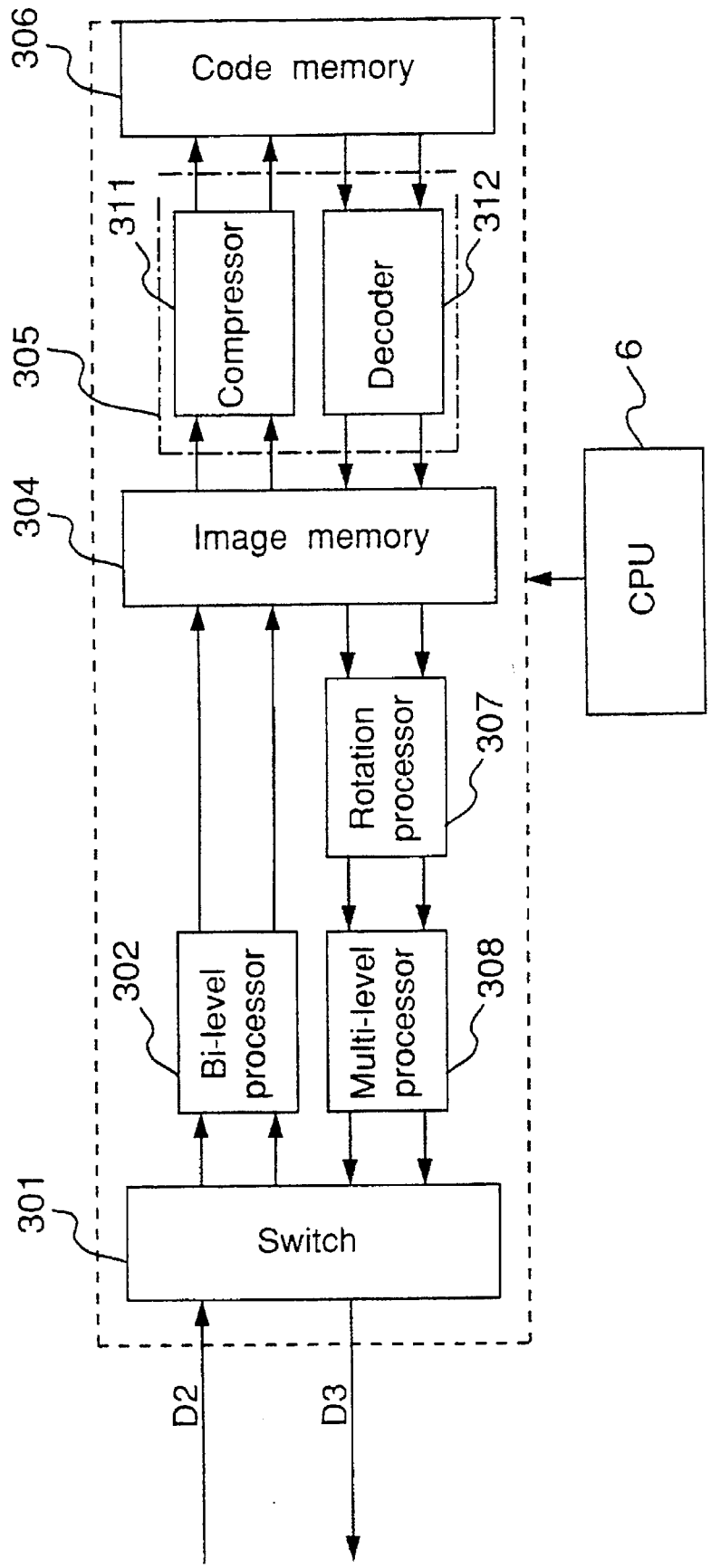
FIG. 4 is a block diagram of a memory unit.

FIG. 4 shows a block diagram of the memory unit 30 controlled by the CPU 6. Image data D2 is received through a switch 301 by a bi-level processor 302 which generates a bi-level data according to parameters supplied by the CPU 6, and the bi-level data is stored in a multi-port image memory 304 having a capacity to store image data of one page of A3 size paper at 400 dots per inch (dpi). For an image data of a document of $X_0 * Y_0$ pixel data, write to the image memory 304 is started from address (0, 0). Then, data of a first line is written along X direction, data of a next line is written along X direction, and so on. The bi-level processor 302 performs not only a simple bi-level processing but also a pseudo-halftone bi-level processing. After the image data are written to the image memory 304, a compressor 311 in a code processor 305 reads the image data and converts them to code data to be stored in a multi-port code memory 306.

A decoder 312 in the code processor 305 reads the code data in the code memory 306 when it receives an instruction from the CPU 6, and decodes the code data to generate image data to be written to the image memory 304. (The decoder 312 operates independently of the compressor 305. Data can be transmitted with direct memory access between the code memory 306 and the compressor 311 or the decoder 312.) When a page of image data is written to the image memory 304 be decoding, a rotation processor 307 reads the image data to sends data in a state where the image is rotated by a rotation angle of 0°, 90°, 180° and 270° instructed by the CPU 6. For example, if the image is rotated by 90°, data are read sequentially from an address $(X_0, 0)$. If the image is rotated by 180°, data are read sequentially from an address $(X_0, Y_0)$. If the image is rotated by 270°, data are read sequentially from an address $(0, Y_0)$. A multi-level processor 308 generates a multi-level data D3 from the bi-level data supplied by the rotation processor 307 according to parameters set by the CPU 6. Then, image data D3 is sent through the switch 301.

(2) Portrait and landscape documents and margin mode and 4-in-1 mode

Figure 5A:
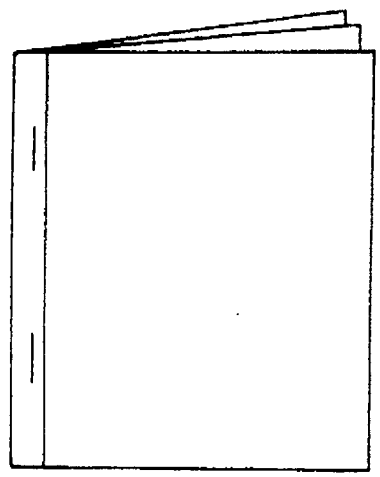
FIGS. 5A and 5B are schematic diagrams of binded documents of portrait documents and landscape documents, respectively.
Figure 5B:
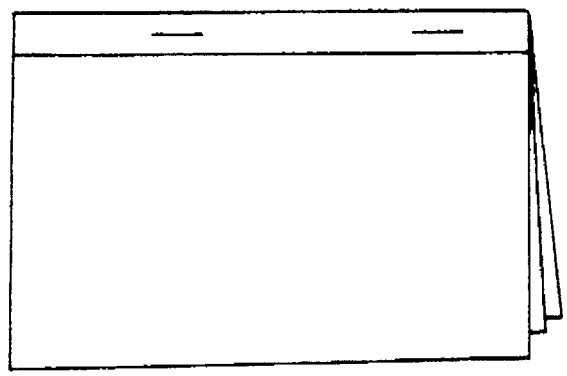

In the digital copying machine of the embodiment, a margin may be provided at a top side and at a left side of document images as shown in FIGS. 5A and 5B, respectively. A user can select a margin position (left or top) and a margin width of 5, 10 or 15 mm with the keys 104 and 103 in the operational panel (FIG. 2).

The position of margin depends on a kind of document such as a portrait document or a landscape document. A user can set a document direction of a portrait document or a landscape document with the key 99. In other words, the top and bottom position means top and bottom with respect to the document direction. If a document is a portrait document, the top margin means a margin provided at an end along the longitudinal direction of the document, while if a document is a landscape document, the top margin means a margin provided at an end along the lateral direction of the document perpendicular to the longitudinal direction.

In the digital copying machine of the embodiment, the largest size which can be dealt by a copying machine is A3, and documents of A3 and B4 sizes can be set only with their longitudinal direction in parallel to the document feed direction. That is, a document occupying more than a half area of the platen 18 can be placed only along a specified direction. On the other hand, if the smallest size of document which can be fed by an automatic document feeder is A5 size, an A5 document can be fed onto the platen 18 only along a longitudinal direction of the document because an A5 size document cannot be carried normally by rollers for feeding a document.

Figure 6A:
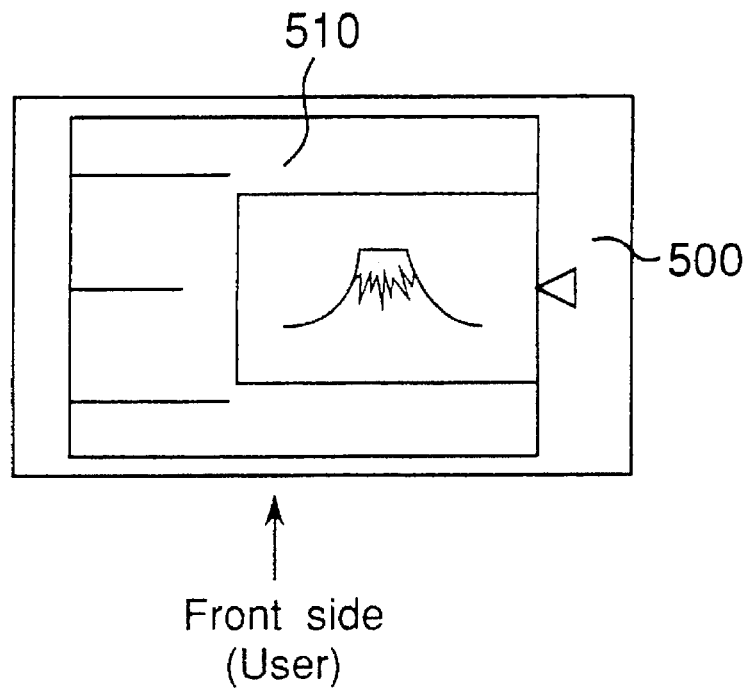
FIG. 6A is a plan view of a landscape document placed on a tray of an automatic document feeder.
Figure 6B:
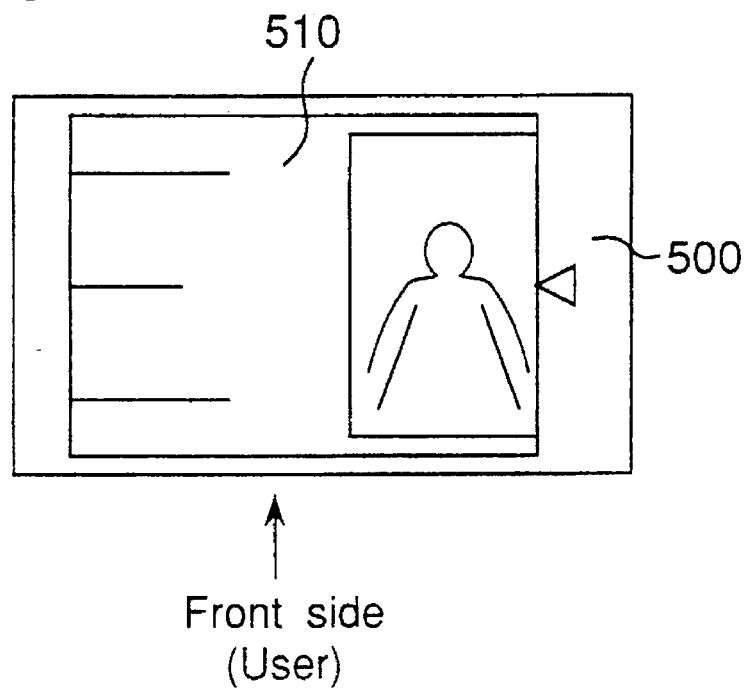
FIG. 6B is a plan view of a portrait document placed on a tray of an automatic document feeder.

If the document size is B5 or A4 which can be set either of two directions on the platen 18, the document direction can be determined automatically by detecting a document size with the sensors SE51 in the automatic document feeder 500 when the document direction is not specified by a user with the key 99. In such case, a document longitudinal along a document feed direction as shown in FIG. 6A is decided as a landscape document, while a document not longitudinal along a document feed direction as shown in FIG. 6B is decided as a portrait document. In a situation shown in FIG. 6A, a landscape document is placed on an automatic document feeder with a longer direction of the document in parallel to document feed direction. In a situation shown in FIG. 6B, a portrait document is placed on an automatic document feeder with a longer direction of the document perpendicular to document feed direction. On the contrary, if a document has a size such as B4 which can be placed only along a document feed direction, a warning is displayed on the panel 91 in the operational panel (FIG. 2) when a user does not specify the document direction with the key 99. Thus, the margin can be set correctly according to the document direction (portrait and landscape) and two types of setting of documents on the platen 18 (along a longitudinal direction of lateral direction).

Figure 7A:
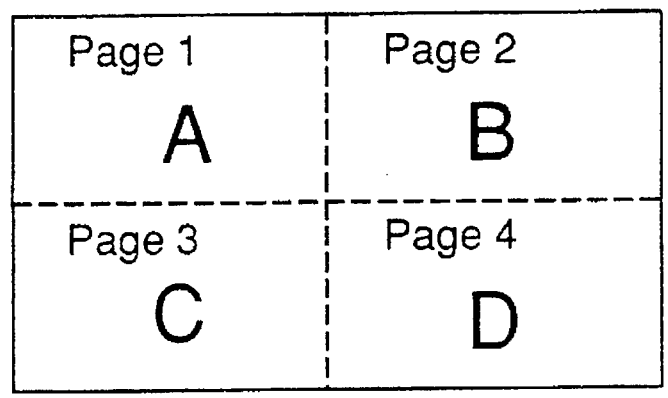
FIGS. 7A and 7B are diagrams of document images of two portrait documents and two landscape documents produced in the 4-in-1 copy mode, respectively.
Figure 7B:
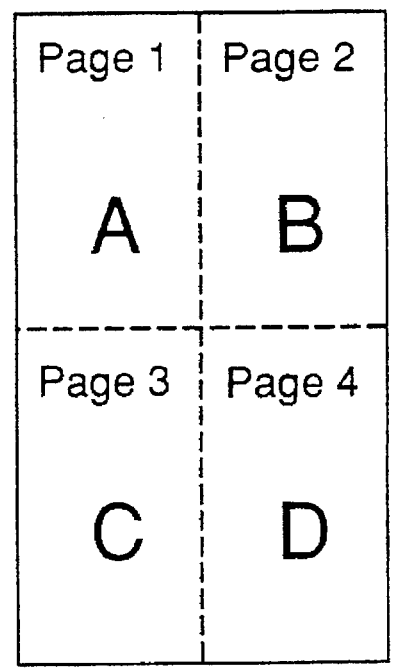

Further, 4-in-1 mode is also provided in the digital copying machine of the embodiment. A user can select 4-in-1 mode with the key 102 in the operational panel (FIG. 2). In 4-in-1 mode, four document images are synthesized on a sheet of paper, as shown in FIGS. 7A and 7B. It is desirable that four landscape documents are synthesized as shown in FIG. 7A, while four portrait documents are synthesized as shown in FIG. 7B. In 4-in-1 mode, the document images are read according to the position of the documents in the automatic document feeder, while the document images are rearranged in a predetermined order for output them on a sheet of paper.

Figure 8A:
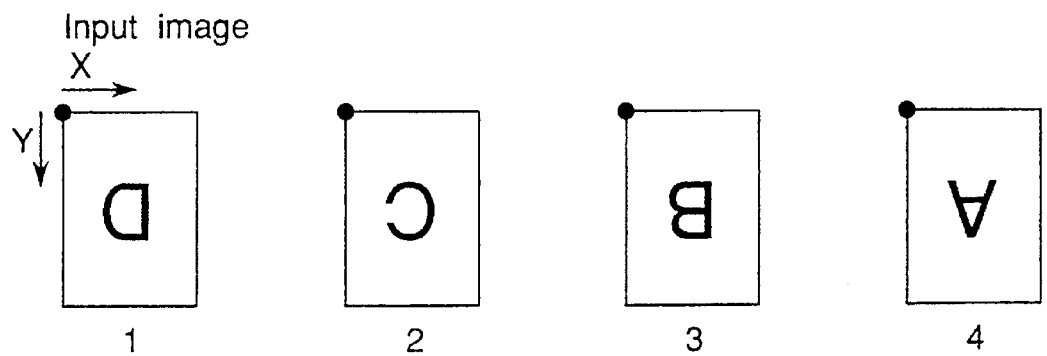
FIG. 8A is a diagram of image data of four portrait documents fed along longitudinal directions thereof.
Figure 8B:
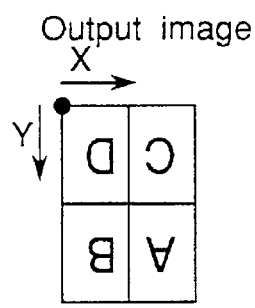
FIG. 8B is a diagram of image data of a synthesized portrait document.

In 4-in-1 mode, a desired image can be formed on a sheet of paper according to document type (portrait and landscape), a longitudinal direction of the document with respect to document feed direction and a longitudinal direction of a sheet of paper with respect to the paper supply direction. FIG. 8A shows document images of four portrait document images stored in the image memory 304 wherein a solid dot denotes an origin of coordinates and X and Y denote line and row directions. The numbers 1, 2, 3 and 4 means the order of reading of the documents by the image reader. These documents are read by feeding them onto the platen 18 of the image reader along a longitudinal direction of the documents. FIG. 8B shows an output image on a sheet of paper when encoded in the order of first, second, third and fourth document images. If these images are output on a copy paper which is longitudinal along paper supply direction, the document image is rotated by 0° or without rotation when decoded, otherwise the document image is rotated by 270° when decoded.

Figure 9A:
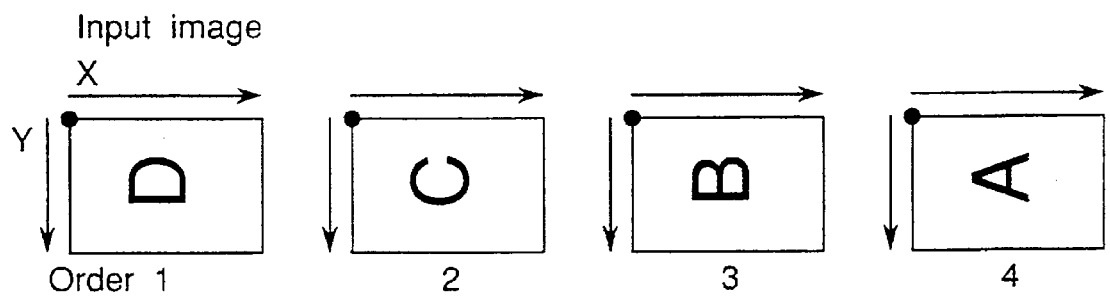
FIG. 9A is a diagram of image data of four portrait documents fed perpendicularly to longitudinal directions thereof.
Figure 9B:
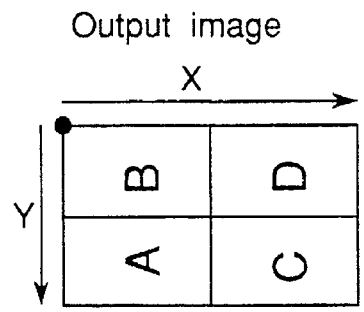
FIG. 9B is a diagram of image data of a synthesized portrait document.

FIG. 9A also shows document images of four portrait document images stored in the image memory 304. The numbers 1, 2, 3 and 4 means the order of reading of the documents by the image reader. However, these documents are read by feeding them onto the platen 18 of the image reader along a direction perpendicular to a longitudinal direction of the documents in contrast to FIG. 8A. FIG. 9B shows an output image on a sheet of paper when encoded in the order of third, first, fourth and second document images. If these images are output on a copy paper which is longitudinal along paper supply direction, the document image is rotated by 90° when decoded, otherwise the document image is rotated by 0° or without rotation when decoded.

Figure 10A:
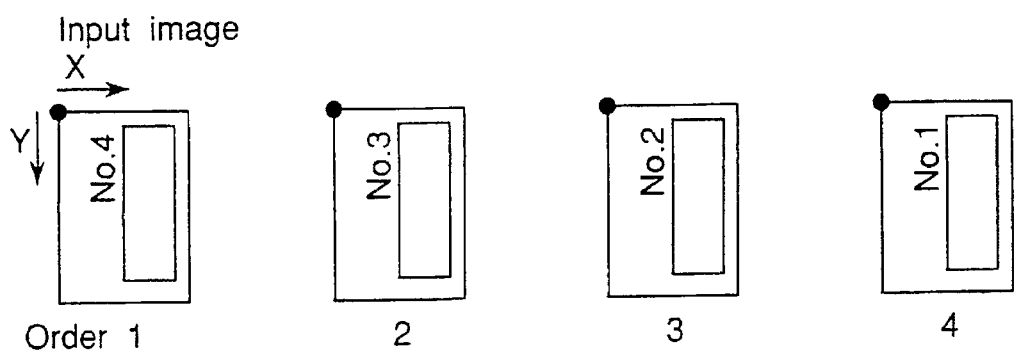
FIG. 10A is a diagram of image data of four landscape documents fed along longitudinal directions thereof.
Figure 10B:
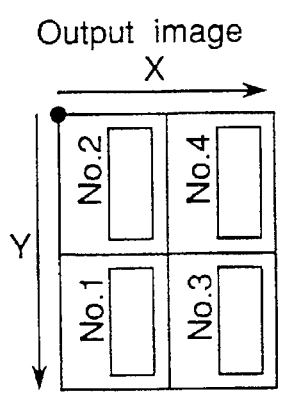
FIG. 10B is a diagram of image data of a synthesized landscape document.

FIG. 10A shows document images of four landscape document images stored in the image memory 304. The numbers 1, 2, 3 and 4 means the order of reading of the documents by the image reader. These documents are read by feeding them onto the platen 18 of the image reader along a direction perpendicular to a longitudinal direction of the documents. FIG. 10B shows an output image on a sheet of paper when encoded in the order of third, first, fourth and second document images. If these images are output on a copy paper which is longitudinal along paper supply direction, the document image is rotated by 0° or without rotation when decoded, otherwise the document image is rotated by 90° when decoded.

Figure 11A:
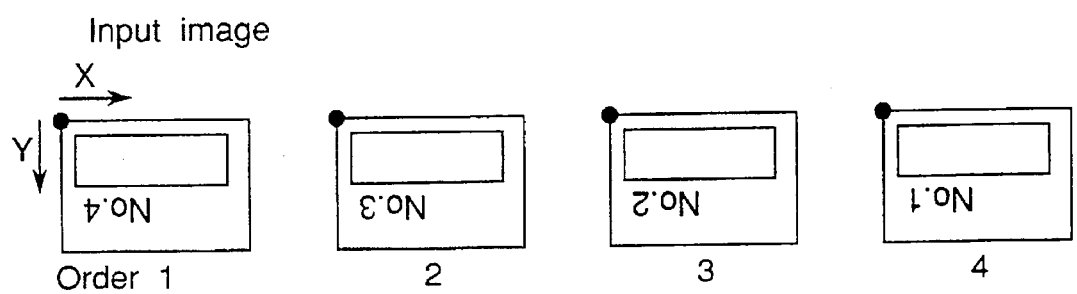
FIG. 11A is a diagram of image data of four landscape documents fed perpendicularly to longitudinal directions thereof.
Figure 11B:
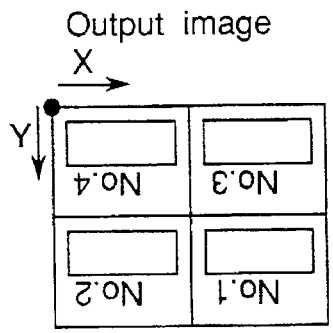
FIG. 11B is a diagram of image data of a synthesized landscape document.

FIG. 11A shows document images of four portrait document images stored in the image memory 304. The numbers 1, 2, 3 and 4 means the order of reading of the documents by the image reader. However, these documents are read by feeding them onto the platen 18 of the image reader along a longitudinal direction of the documents in contrast to FIG. 10A. FIG. 11B shows an output image on a sheet of paper when encoded in the order of first, second, third and fourth document images. If these images are output on a copy paper which is longitudinal along paper supply direction, the document image is rotated by 90° when decoded, otherwise the document image is rotated by 0° or without rotation when decoded.

In the above-mentioned 4-in-1 mode, four document images are rearranged according to an order which depends on the document direction (portrait or landscape) and the direction of the documents with respect to the document feed direction.

(3) Detail explanation of the operations by the CPUs

Figure 12:
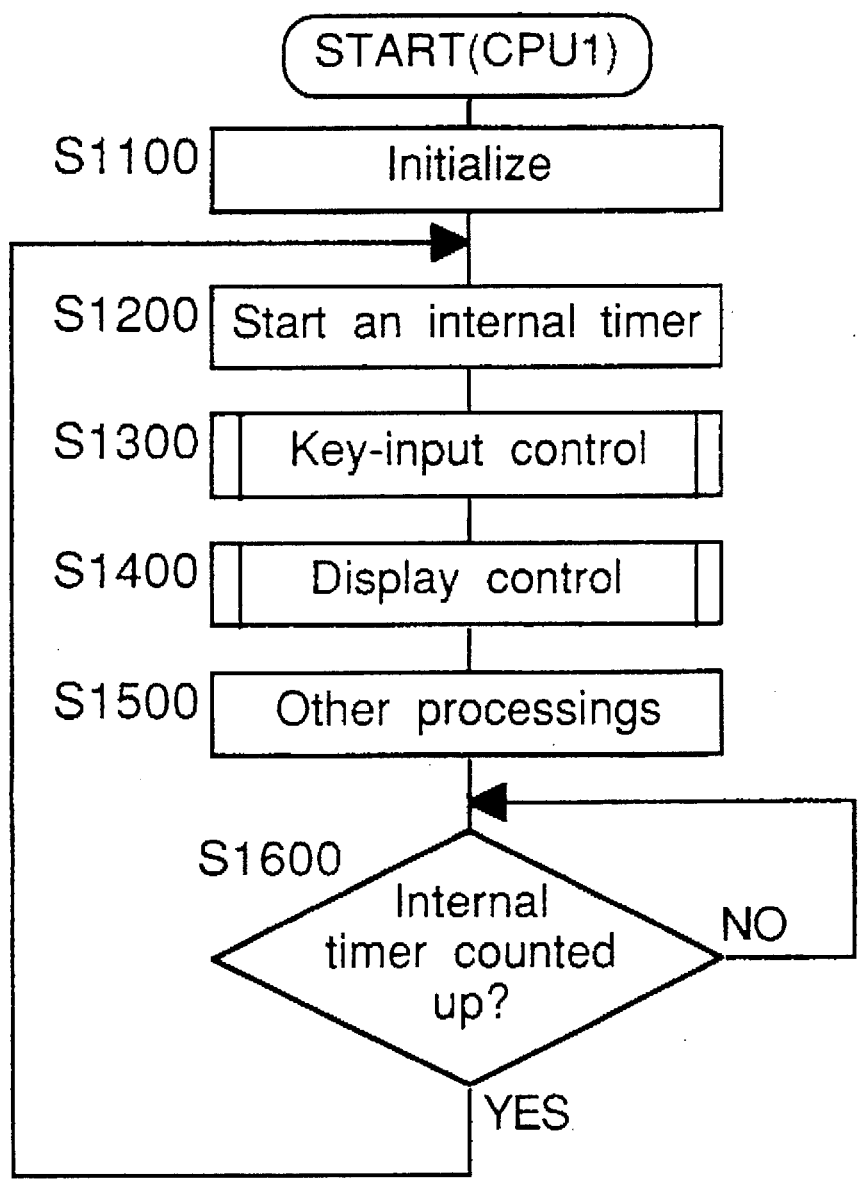
FIG. 12 is a main flowchart of CPU 1 which controls an operational panel.
Figure 13A:
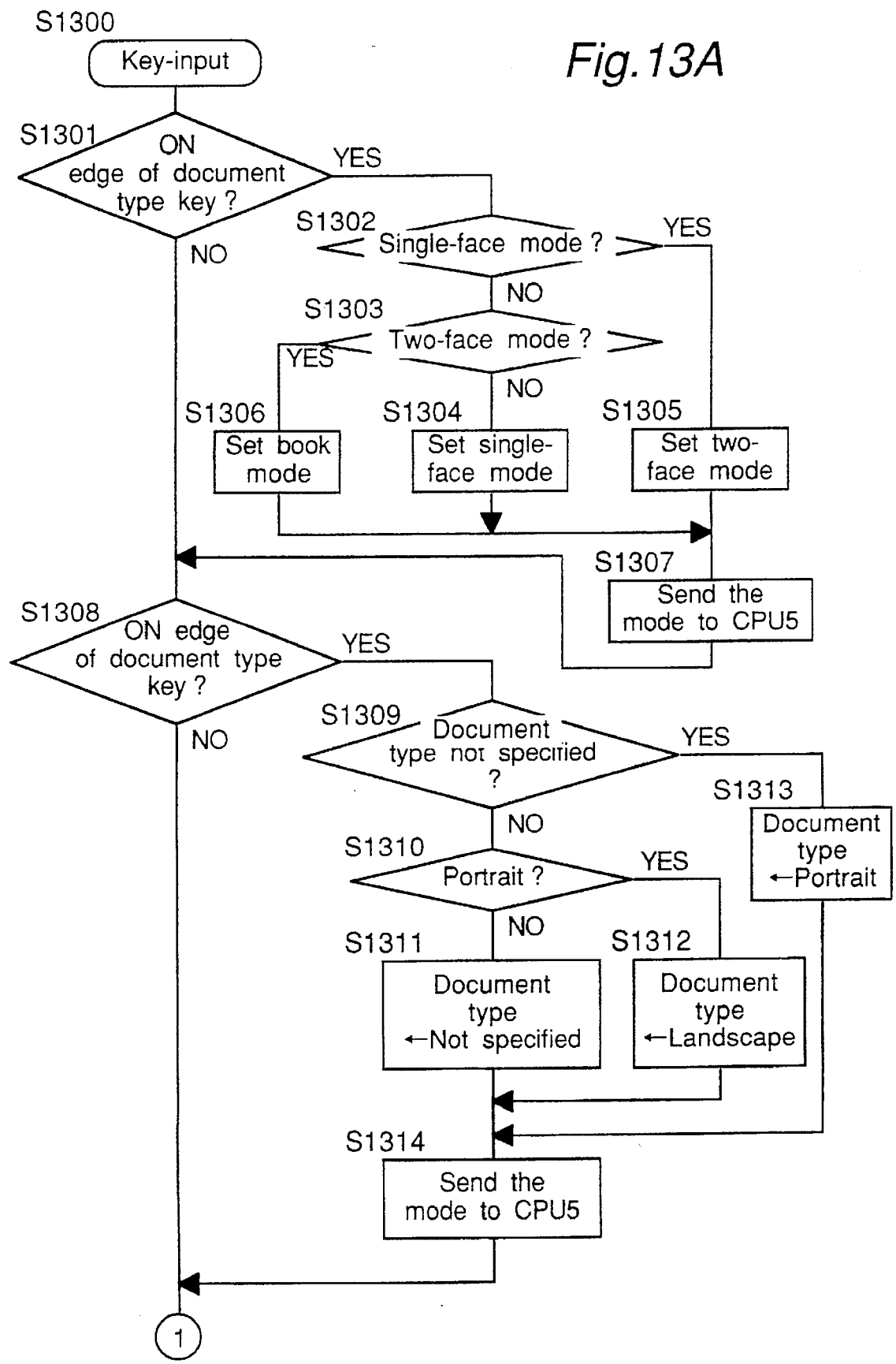
FIGS. 13A, 13B, 13C, 13D and 13E are a flowchart of key-input control.
Figure 13B:
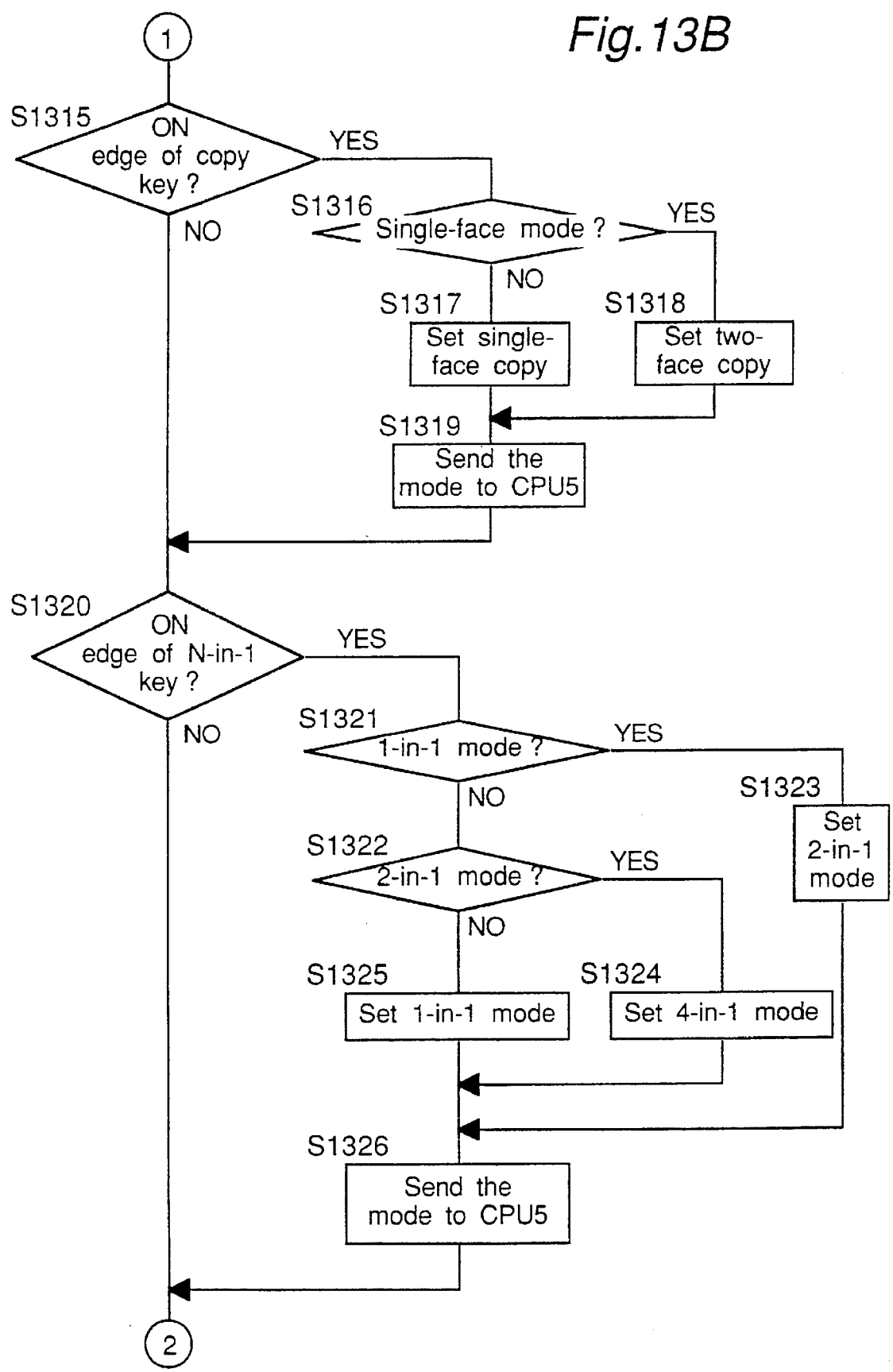
Figure 13C:
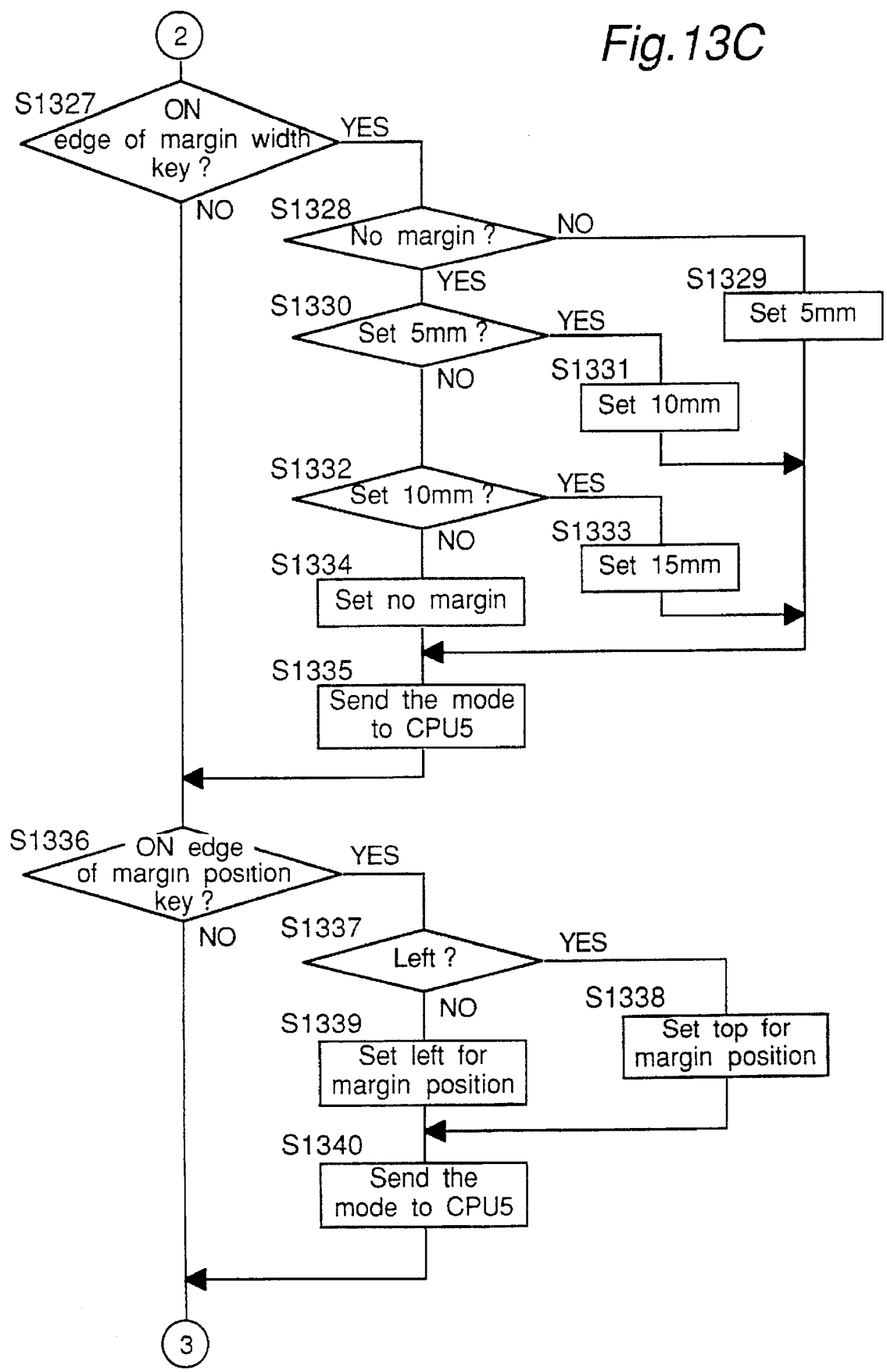
Figure 13D:
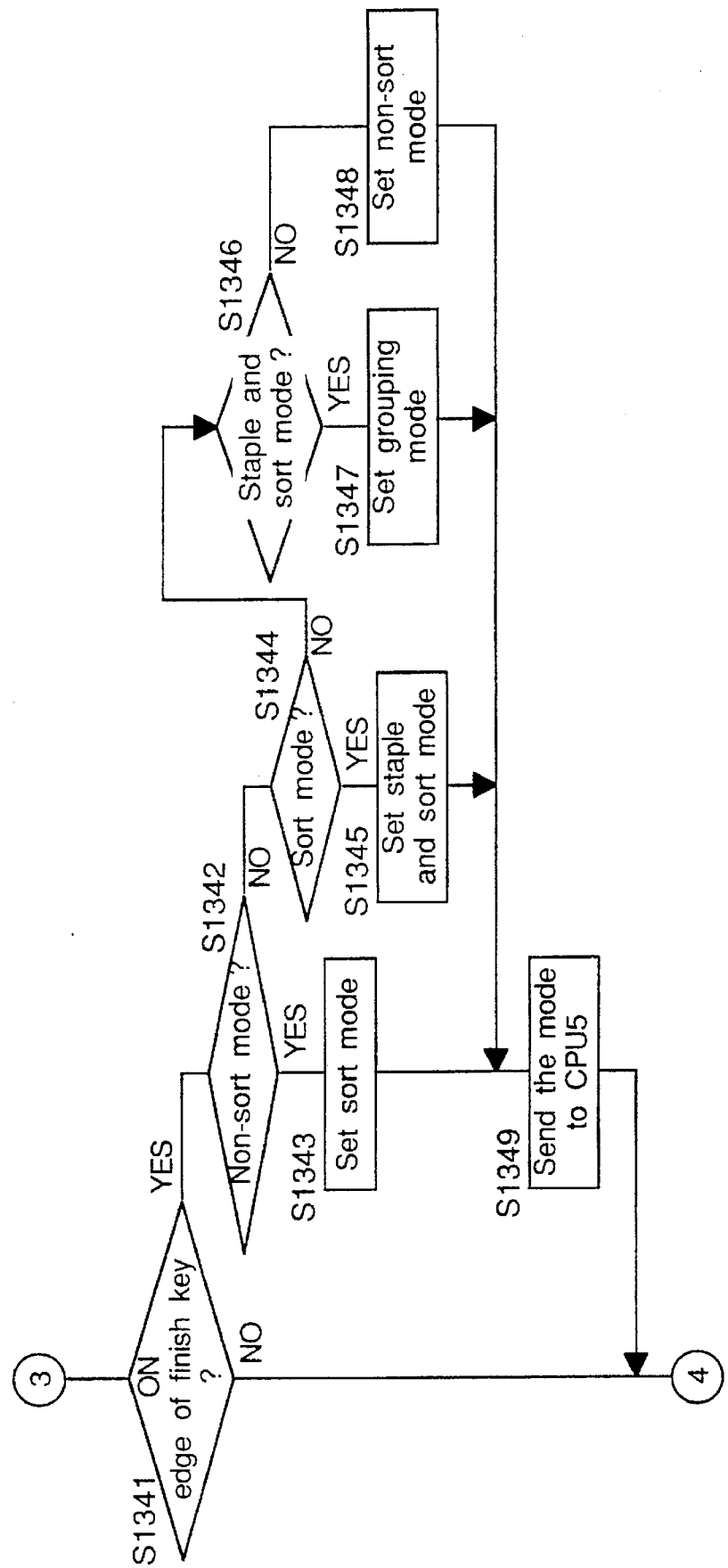
Figure 13E:
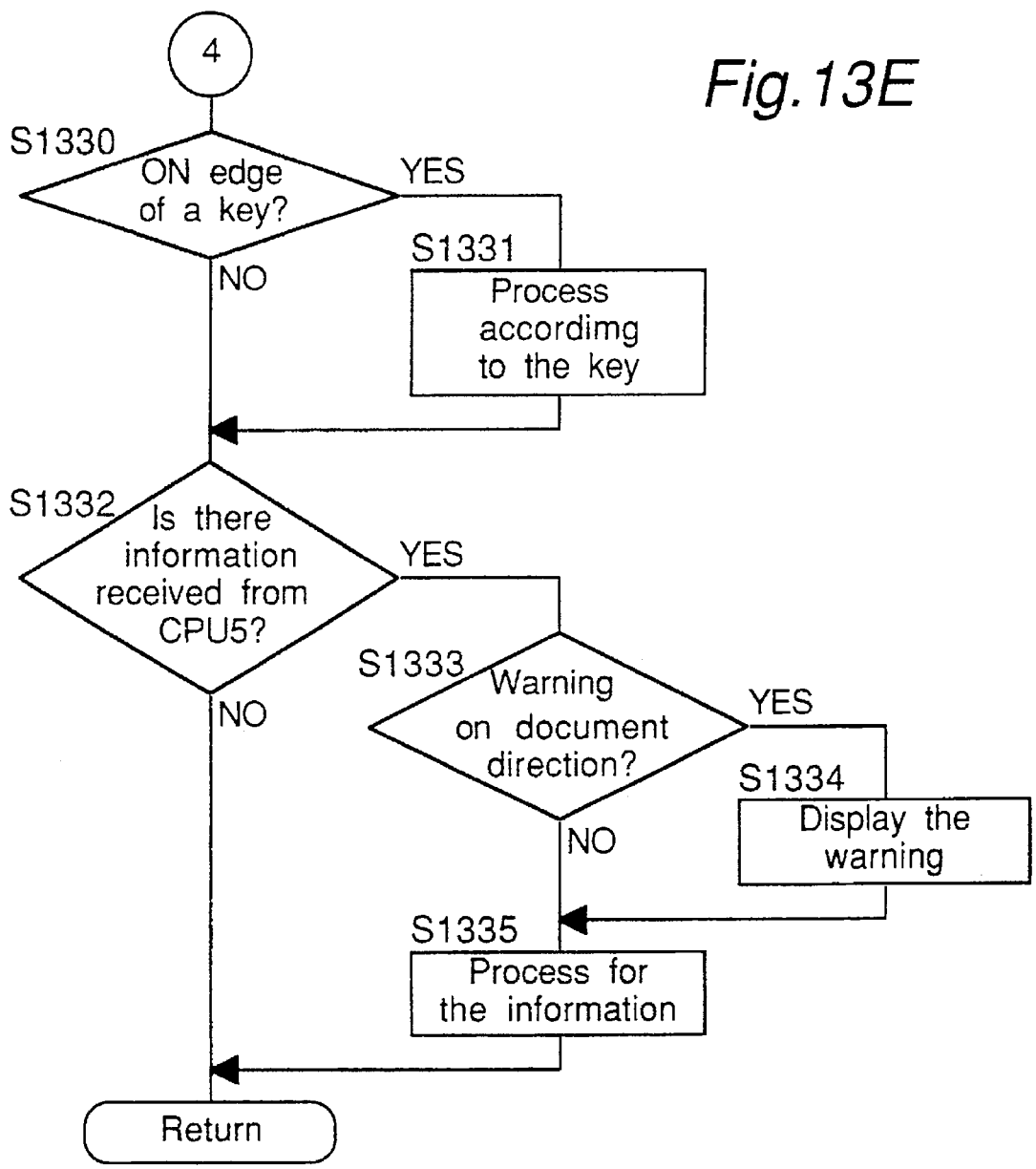

The operation of the copying machine 1 is explained below in detail with reference to flowcharts. FIG. 12 shows a main flowchart of the CPU 1 which controls key-inputs and displays for the operational panel 90. First, the CPU 1 is initialized (step S1100). Then, an internal timer is started for monitoring to keep a time needed for one routine of this flow constant (step S1200), and key-input control (step S1300), and display control (step S1400) are performed successively. Then, other processings not explained here are performed (step S1500). Then, it is waited that the timer is counted up (step S1600), and the flow returns to step S1200. The CPU 1 communicates with other CPUs 2–8 by interrupt processing.

FIGS. 13A–13E show a flow of the key-input control (step S1300 in FIG. 12). In this flow, displays in the touch panel 91 are changed according to a key-input by a user, and signals in correspondence to the key-inputs are sent to the CPU 5. When a key-input of the document type key 100 is received (YES at step S1301), document type (single-face document, two-face document or book) is selected cyclicly. If single-face document mode has not been set or the LED 100c is not turned on (NO at step S1302), two-face document mode is set (step S1305), or the LEDs 100b and 100c are turned off and the LED 100a is turned on. On the other hand, if single-face document mode has been set (YES at step S1302), it is decided next if two-face mode has been set or if the LED 100a is turned on (step S1303). If two-face mode is decided to be set (YES at step S1303), a book mode is set or the LEDs 101a and 101c are turned off and the LED 100b is turned on (step S1306), otherwise single-face document mode is set (step S1304), or the LEDs 100a and 100b are turned off and the LED 100c is turned on. Then, the mode change is transmitted to the CPU 5 (step S1307).

When a key-input of the document type key 99 is received (YES at step S1308), document type (portrait or landscape) is selected cyclically. If a document type has not been set or the LEDs 99a and 99b are turned off (YES at step S1309), portrait mode is set (step S1313), or the LED 99b is turned on. On the other hand, if portrait mode has been set or the LED 99a is turned on (YES at step S1310), landscape mode is set (step S1312), or the LED 99a is turned off and the LED 99b is turned on. Further, if landscape mode has been set or the LED 99b is turned on (NO at step S1310), document type is not set (step S1311), or the LEDs 99a and 99b are turned off. Then, the document type change is transmitted to the CPU 5 (step S1314).

When a key-input of the copy key 101 is received (YES at step S1315), copy mode (single-face copy mode or two-face copy mode) is changed cyclicly. If single-face copy mode has been set or the LED 101b is turned on (YES at step S1316), two-face copy mode is set (step S1318), or the LED 101b is turned off and the LED 101a is turned on. On the other hand, if single-face copy mode has not been set or the LED 101a is turned on (NO at step S1316), single-face copy mode is set (step S1317), or the LED 101a is turned off and the LED 101b is turned on. Then, the copy mode change is transmitted to the CPU 5 (step S1319).

When a key-input of the N-in-1 key 102 is received (YES at step S1320), 4-in-1 mode, 2-in-1 mode or 1-in-1 mode is selected cyclicly. If 1-in-1 mode has been set or the LED 102a is turned on (YES at step S1321), 2-in-1 mode is set (step S1323), or the LED 102a is turned off and the LED 102b is turned on. On the other hand, if 1-in-1 mode has not been set (NO at step S1321), it is decided next if 2-in-1 mode has been set or the LED 102b is turned on (step S1322). If 2-in-1 mode has been set or the LED 102b is turned on (YES at step S1322), 4-in-1 mode is set (step S1324) or the LED 102c is turned on, otherwise 1-in-1 mode is set (step S1325), or the LEDs 102b and 102c are turned off and the LED 102a is turned on. Then, the copy mode change is transmitted to the CPU 5 (step S1326).

When a key-input of the margin width key 103 is received (YES at step S1327), a margin width of 5, 10 or 15 mm is selected cyclicly. It is decided first if no margin width has been set (step S1328) or if the LEDs 103a, 103b and 103c are turned off. If no margin width is decided to be set (NO at step S1328), a margin width of 5 mm is set (step S1329) or the LED 103a) is turned on. If a margin width of 5 mm is decided to be set (YES at step S1330) or if the LED 103a is turned on, a margin width of 10 mm is set (step S1331) or the LED 103a is turned off and the LED 103b is turned on. If a margin width of 10 mm is decided to be set (YES at step S1332) or if the LED 103b is turned on, a margin width of 15 mm is set (step S1333) or the LED 103b is turned off and the LED 103c is turned on. Otherwise the margin width of 15 mm has been set, and no margin is set (step S1334) or the LED 103c is turned off. Then, the copy mode change is transmitted to the CPU 5 (step S1335).

When a key-input of the margin position key 104 is received (YES at step S1336), margin position is selected cyclically. If a margin position has been set at left or the LED 104a is turned on (YES at step S1337), top side of document is set for margin (step S1338), or the LED 104b is turned on. On the other hand, if the margin position has not been set at left (NO at step S1337), left side of document is set for margin (step S1339). Then, the margin mode change is transmitted to the CPU 5 (step S1340).

When a key-input of the finish key 97 is received (YES at step S1341), finish mode is selected cyclicly among non-sort mode, sort mode, sort and staple mode and grouping mode. It is decided first if non-sort mode has been set (step S1347) or if the LEDs 98a, 98b and 98c are turned off. If non-sort mode is decided to be set (NO at step S1342), sort mode is set (step S1343) or the LED 98b is turned on. If sort mode is decided to be set (YES at step S1344) or if the LED 98b is turned on, staple and sort mode is set (step S1345) or the LED 98b is turned off and the LED 98c is turned on. If staple and sort mode is decided to be set (YES at step S1346) or if the LED 98c is turned on, grouping mode is set (step S1347) or the LED 98b is turned off and the LED 98c is turned on. Otherwise grouping mode has been set, and non-sort mode is set (step S1348) or the LED 98d is turned off and the LED 98a is turned on. Then, the copy mode change is transmitted to the CPU 5 (step S1349).

When one of the other key-inputs is received (YES at step S1355), processing for the key-input is performed (step 1356).

When information is received from the CPU 5 (YES at step S1357), if it is a warning that document direction is not specified (YES at step S1358), it is requested to display the warning on the touch panel 91 (step S1358). On the other hand, if it is not the warning (NO at step S1358), a processing according to the receive information is performed (step S1360). Then, the flow returns to the main flow.

Figure 14:
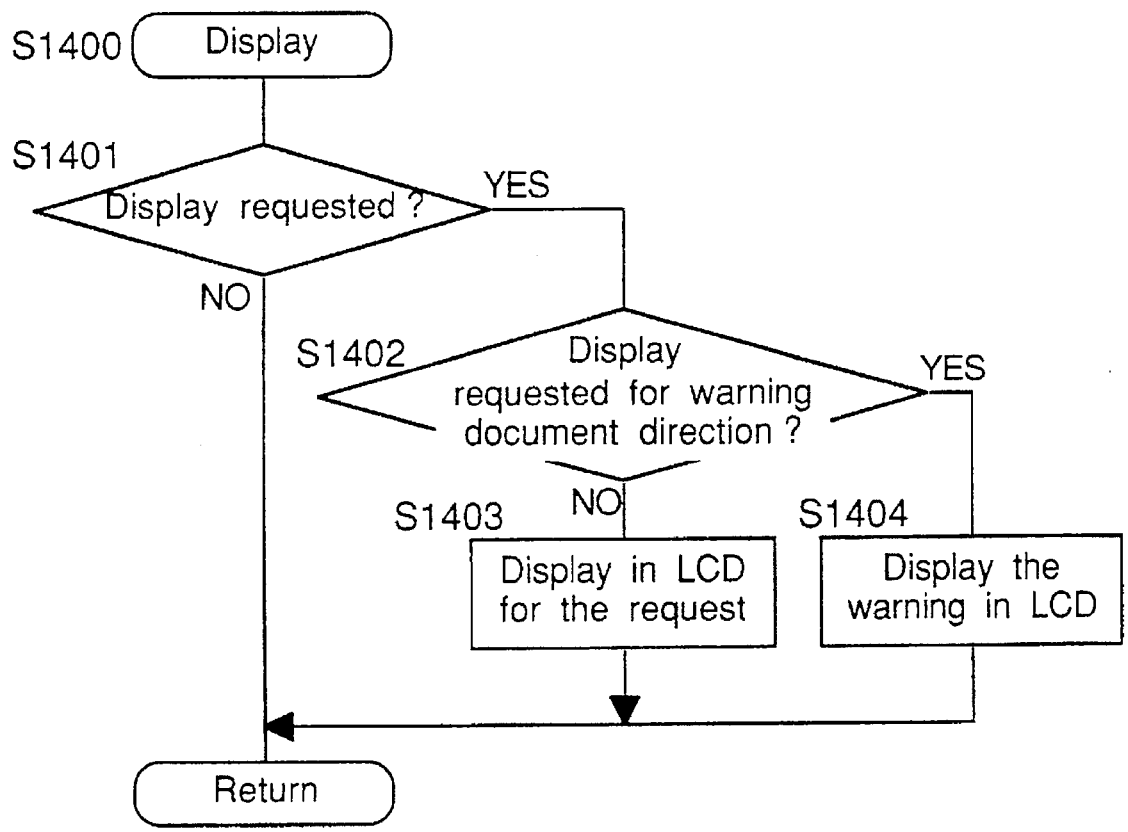
FIG. 14 is a flowchart of display control.
Figure 15:
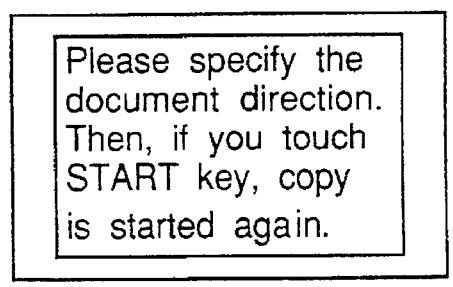
FIG. 15 is a plan view of a touch panel which displays a request.

FIG. 14 shows a flow of display control (step 1400 in FIG. 14). If it is decided that a display request is received (YES at step S1401) and if the display request is a request for displaying a warning that the document direction is not set (YES at step S1402), a display shown in FIG. 15 is displayed on the touch panel 91 in order to request to specify a document direction. Otherwise a display processing in correspondence to the receive display request is performed (step S1403). Then, the flow returns to the main flow.

Figure 16:
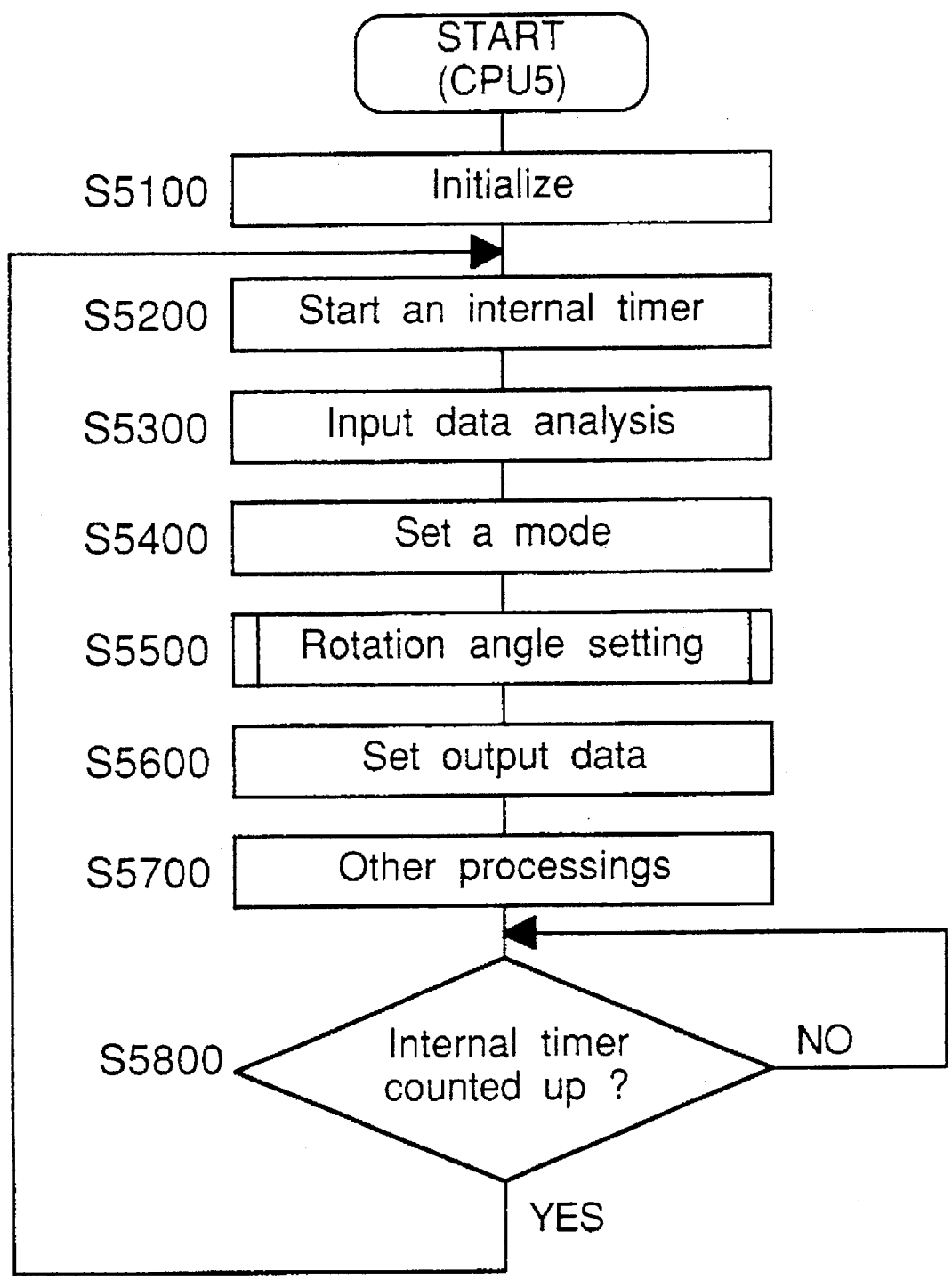
FIG. 16 is a flowchart of a main routine of CPU 5 for controlling timings between various processings.

FIG. 16 shows a flow of a main routine of CPU 5 which sends commands and sets operation modes for other CPUs for controlling the timing of various sections in the copying machine. First, the CPU 5 is initialized (step S5100). Then, an internal timer is started for monitoring a time needed for one routine of this flow to keep it constant (step S5200). Then, input data is analyzed (step S5300) wherein input data transmitted according to an interrupt is checked and analyzed. If a mode is changed in the input data analysis, the operation mode is set (step S5400). Then, a rotation angle is set for the image memory 304 according to the operation mode (step S5500), and the data are provided at an output area for data transmission (step S5600). Then, other processings not explained above are performed (step S5700). Then, it is waited that the timer is counted up (step 5800), and the flow returns to step S5200.

FIGS. 17A–17D show a flow for setting commands according to the operation mode (step S5500 in FIG. 16). Various data such as document size, margin position, margin width or document type which have been received from the CPU 1 are stored in the memory 125. First, document feed is requested to CPU 7 (step S5501), and a report of completion of feeding a document is waited (step S5502). Then, if margin mode is not set or a margin width is decided not to be set (NO at step S5504) and 4-in-1 mode is set (YES at step S5505), the flow proceeds to step S5507. If a margin width is decided (YES at step S5504) but if a margin position is not decided to be set as left or top (NO at step S5506), the flow also proceeds to step S5507 to decide a document direction as portrait or landscape. Otherwise the flow proceeds to step S5513 without deciding a document direction as portrait or landscape.

At step S5507, document direction is started to be decided. First it is checked if a document size is either B5 or A4. In the present embodiment, documents of B5 and A4 can be placed on the platen 18 either along longitudinal direction or along lateral direction. Then, if the document size is either of B5 and A4 (YES at step S5507), and if document type (portrait or landscape) is received from the CPU 1 or determined by a user (YES at step S5508), portrait mode or landscape mode is decided according to the document type received from the CPU 1 (steps S5511, S5512 and S5513). That is, if the document type is portrait (YES at step S5511), portrait mode is decided (step S5512), otherwise landscape mode is decided (step S5513). On the other hand, if document type is decided not to be received from the CPU 1 (NO at step S5508), the document type is decided automatically according to the longitudinal direction of the document with respect to document feed direction in the automatic document feeder 500. That is, if the document is decided to be a longitudinal document which is fed by the automatic document feeder 500 along a longitudinal direction of the document (YES at step S5509), landscape mode is decided (step S5513), otherwise portrait mode is decided (step S5512). If the document size is decided not to be either B5 or A4 (NO at step S5507), and if document type is decided to be received from the CPU 1 (YES at step S5510), portrait mode or landscape mode is decided according to the document type received from the CPU 1 (steps S5511, S5512 and S5513). Then, the flow proceeds to step S5520.

On the other hand, if the document size is decided not to be either B5 or A4 (NO at step S5507), and if document type is decided not to be received from the CPU 1 (YES at step S5510), a warning that the document type is not specified is sent to CPU 1 (step S5514). Then, if the document type is received from the CPU 1 (YES S5515), portrait mode or landscape mode is decided according to the document type received from the CPU 1 (steps S5516, S5517 and S5518). Then, after a key-input of the start key 96 is received from the CPU 1 (YES at step S5519), the flow proceeds to step S5520.

At step S5520, a scan request is sent to the CPU 3. Then, digital image data are received and make them to be stored in the image memory 304 (step S5521), and the digital image data are compressed by the compressor 311 to be stored in the code memory 306 (step S5522). Then, if it is decided that a next document is decided to exist (YES at step S5523), a document feed request is sent to the CPU 7 (step S5524), and after the document feed is completed (YES at step S5525), the flow proceeds to step S5520, to read the next document. On the other hand, if a next document is not decided to exist (NO at step S5523), or all document feed and read processes are completed, page order of document images is rearranged (step S5526), and the margin position is set (step S5527).

Next, after memory settings are initialized (step S5528), one or more document images are decoded by the encoder 312 to be written to the image memory 304 (step S5529). If 1-in-1 mode (normal copy mode) is decided to be set (NO at step S5531), the flow proceeds readily to step S5535, and the image data stored in the image memory 304 is rotated by a prescribed angle and output while a prescribed margin is set. Then, if a next image to be output is decided to exist (YES at step S5536), the flow returns to step S5528, otherwise the flow returns to the main flow.

If either of 2-in-1 mode and 4-in-1 mode is decided to be set (YES at step S5530), another image is decoded to be stored in the image memory 304 (step S5531). If 4-in-1 mode is decided to be set (YES at step S5532), two more images are decoded to be stored in the image memory 304 (step S5531). Then, the image data stored in the image memory 304 is rotated by a prescribed angle and output while a prescribed margin is provided (step S5535). In a next image is decided to exist (YES at step S5536), the flow returns to step S5528, otherwise the flow returns to the main flow.

In a modified embodiment, the type of a document (portrait or landscape) specified with the operational panel is stored in the memory 125. Then, after a size of the document is detected, it is decided whether or not the document size allows the document to be placed on the platen only along a specified direction. For example, if the document size is equal to or less than a half of the image read area of the platen, the document is placed on the platen only along a specified direction. If the document size does not limit the direction of the document, the document type is decided according to the document direction on the platen, and the data on the document type in the memory 125 is rewritten according to the decided document type. That is, the image forming is performed by using the document type stored in the memory 125.

An example of setting a margin at step S5535 while rotating the image is explained. For example, a margin width of 5 mm can be provided at the left side of a portrait document by outputting a white data in a 5 mm width at the left side with respect to the longitudinal direction in the image data and next the image data rotated by a prescribed angle. In this case, image data of 5 mm width at the right side is removed without printed on a paper. In a different example, image data of 5 mm width at the left side are all replaced with a white data. In this case, image data of 5 mm width at the left side is removed without printed on a paper. In a further example, a document margin which means a white part except an image is utilized. If a document margin is larger than the margin width of 5 mm, a further margin is not added to the image data. On the other hand, if a document margin is smaller than the margin width of 5 mm, a margin having a width of a difference between them is provided. Then, no excess margin is provided to prevent image data uselessly.

Figure 17A:
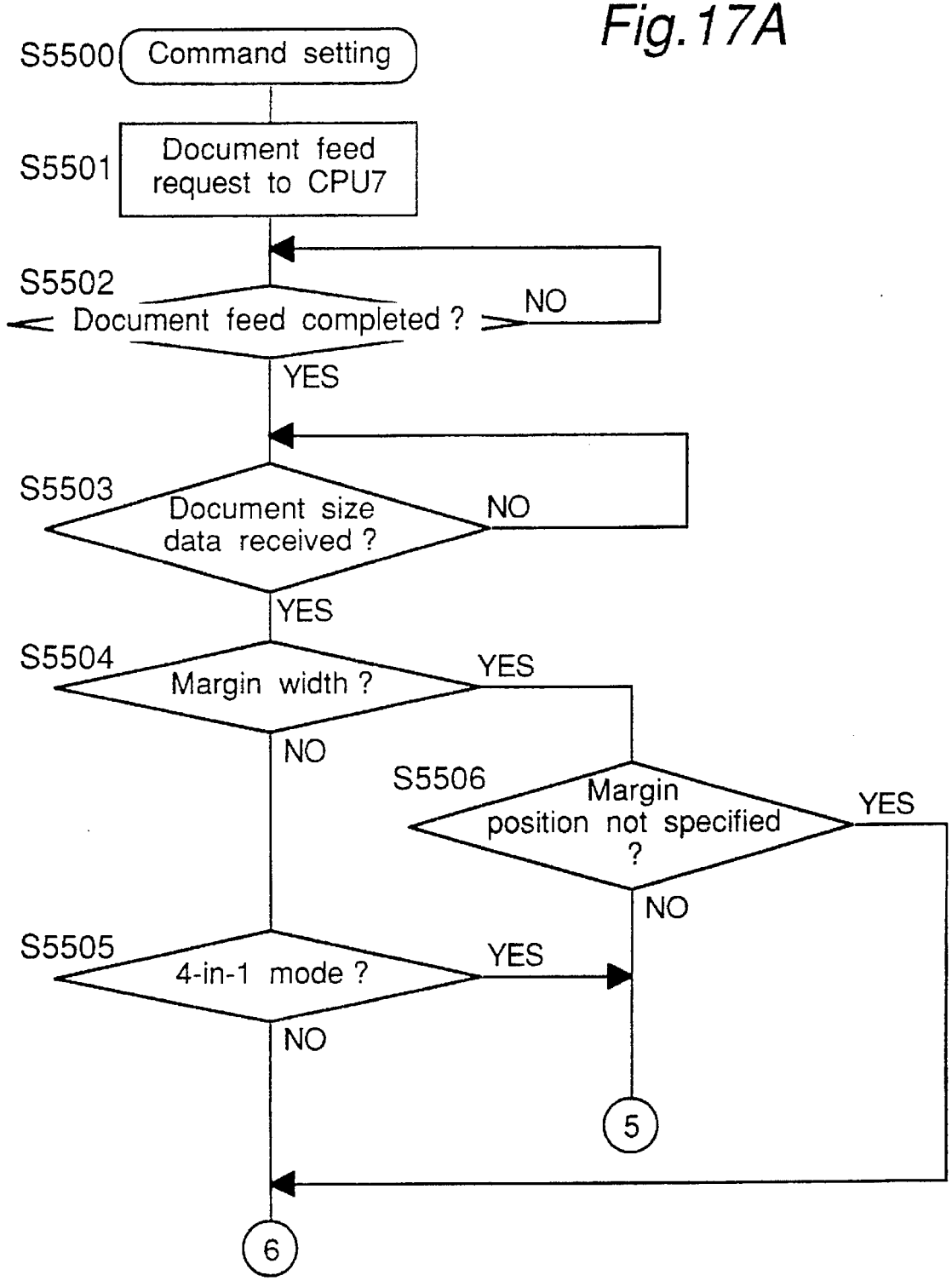
FIGS. 17A, 17B, 17C and 17D are a flowchart of command setting.
Figure 17B:
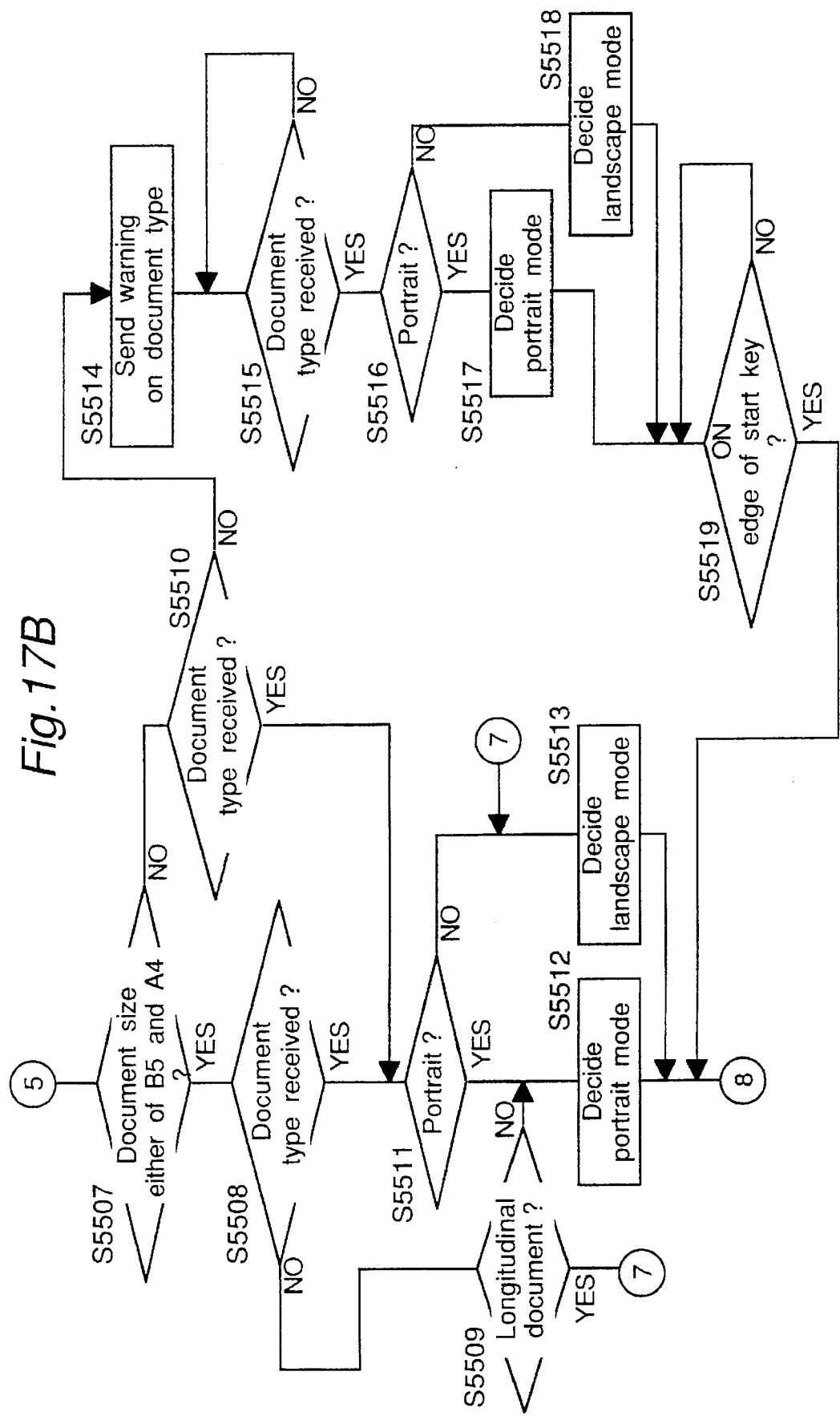
Figure 17C:
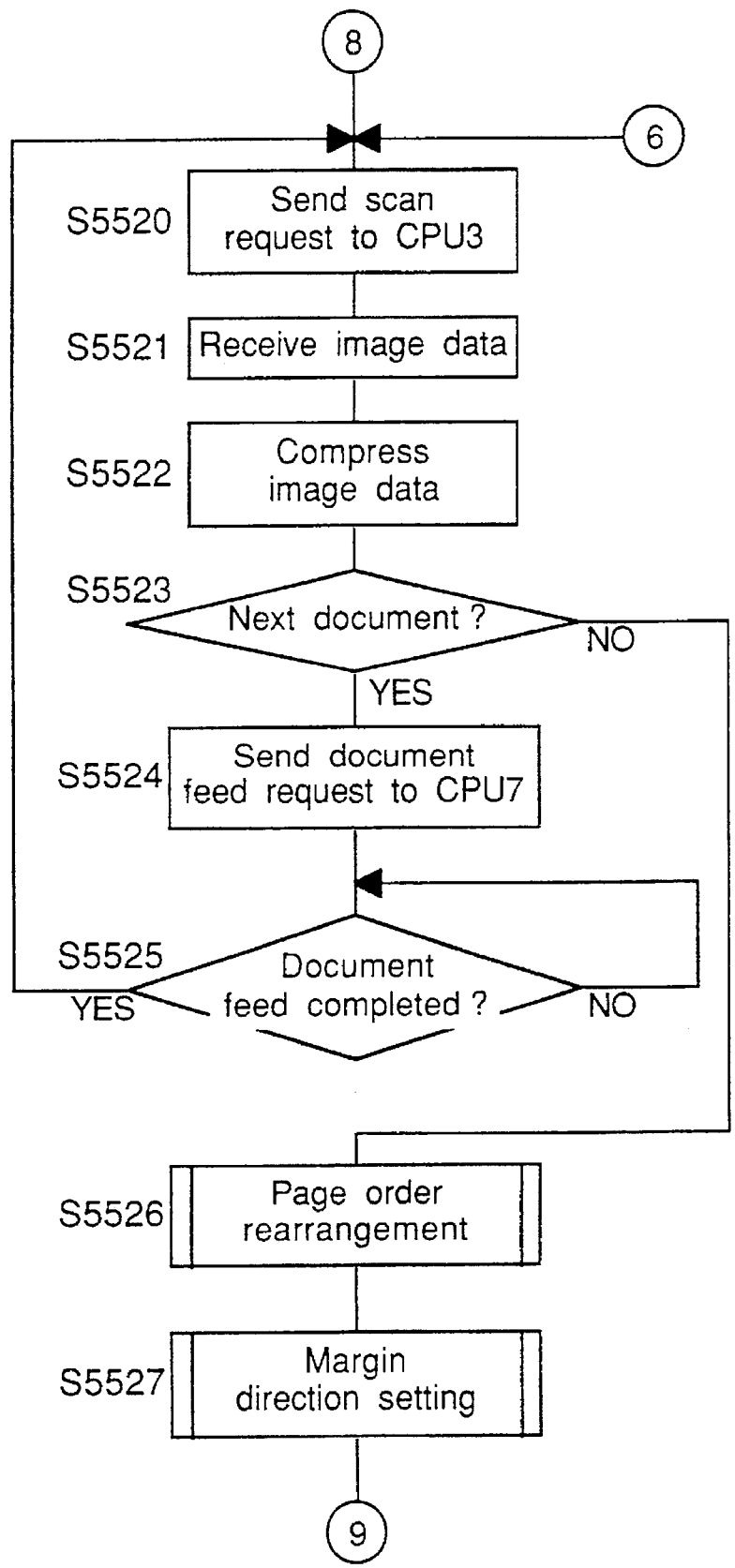
Figure 17D:
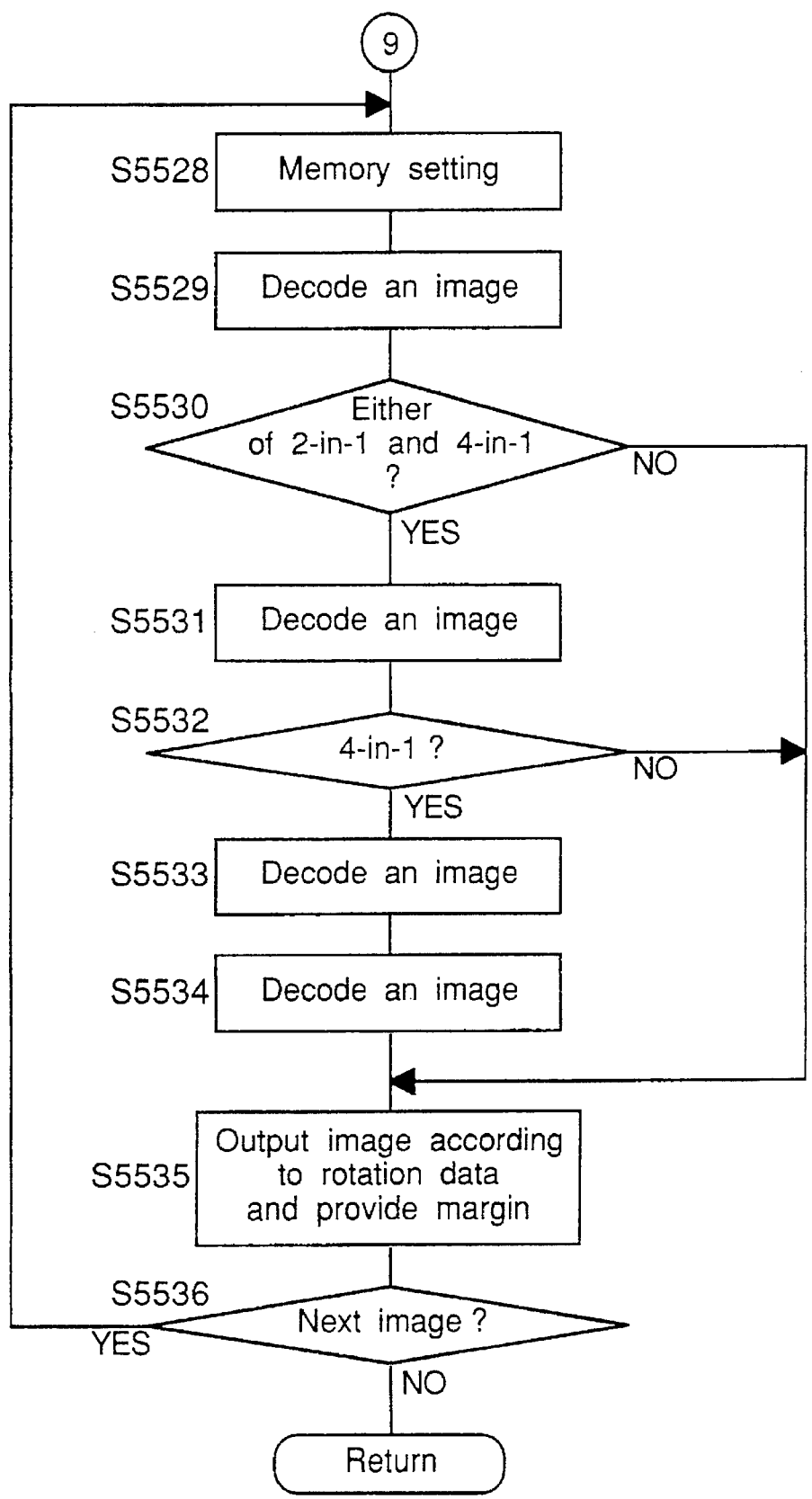
Figure 18A:
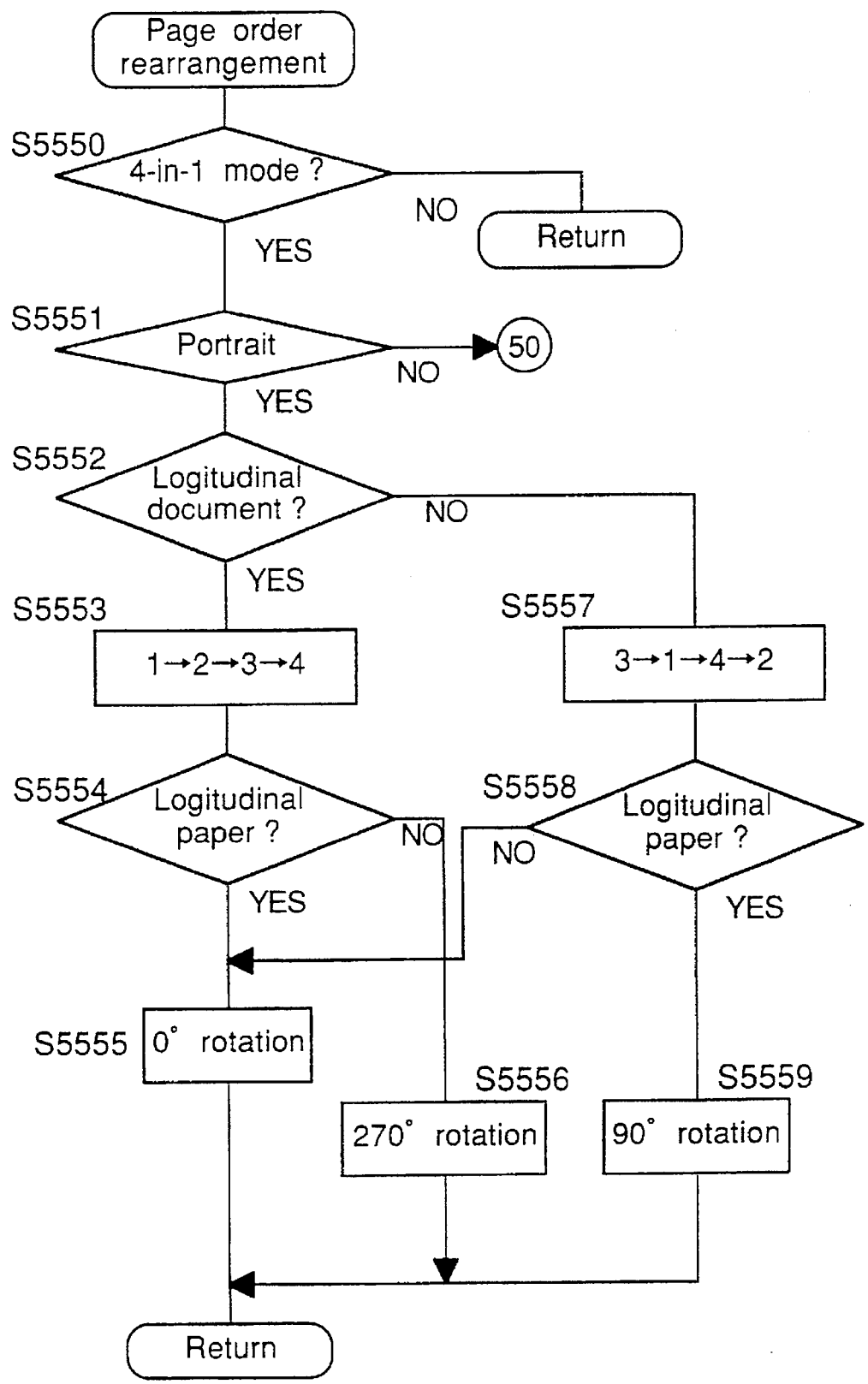
FIGS. 18A and 18B are a flowchart of page order rearrangement.
Figure 18B:
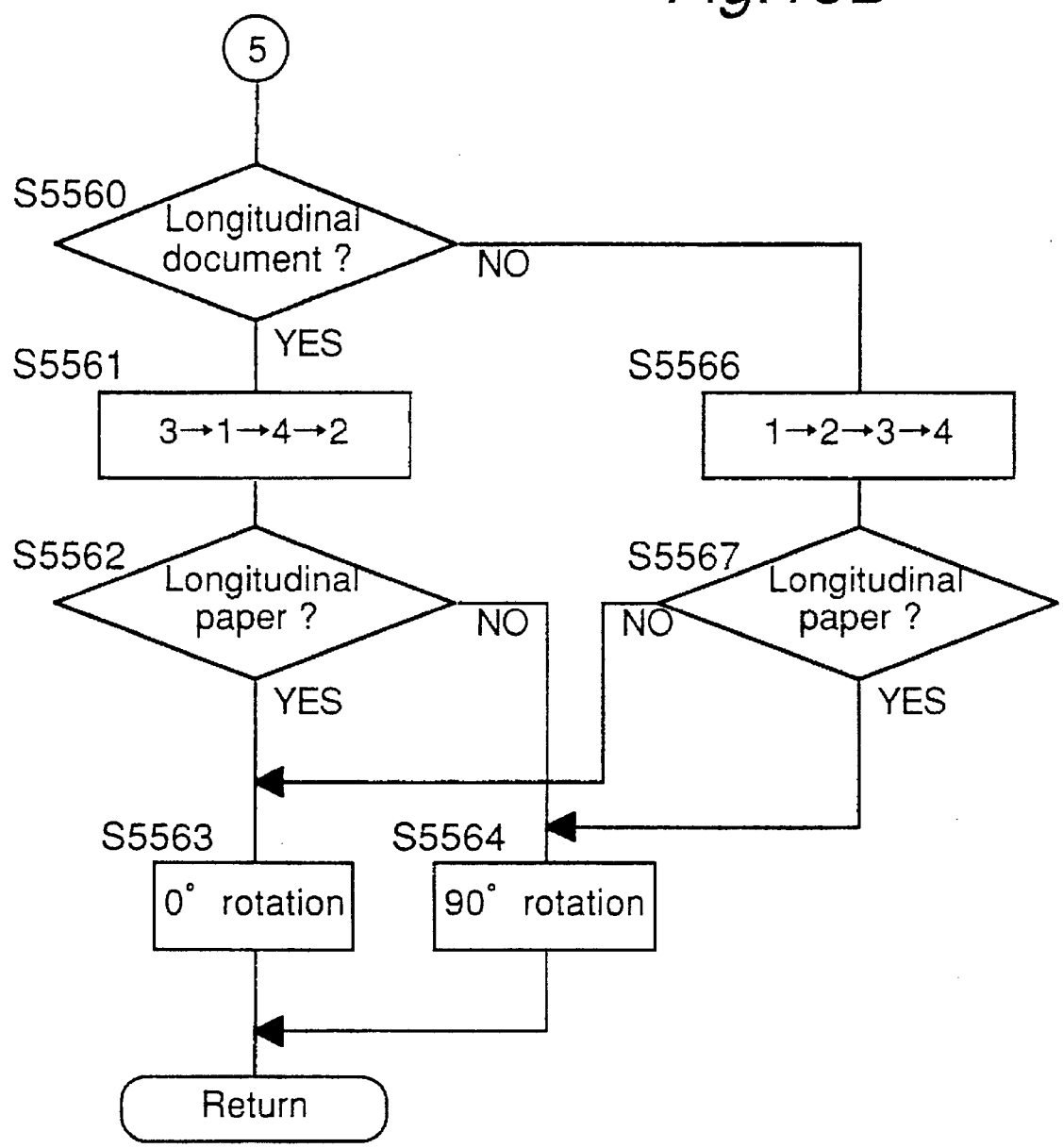

FIGS. 18A and 18B show a flow of page order rearrangement for 4-in-1 mode (step S5526 in FIG. 17C). First, it is checked if 4-in-1 mode is set or not (step S5550). If 4-in-1 mode is decided not to be set (NO at step S5550), the flow returns readily. If 4-in-1 mode is decided to be set (YES at step S5550), it is decided next if portrait mode is set or not (step S5551). If portrait mode is decided to be set (YES at step S5551), it is decided next if a document is fed onto the platen 18 of the image reader along a longitudinal direction of the document (step S5552). If it is decided that the document is fed along the longitudinal direction thereof (YES at step S5552), the order of the decoding of first, second, third and fourth document images read by the image reader is set as first, second, third and fourth document image (step S5553). Then, it is decided next if a copy paper is a longitudinal paper or not (step S5554). If the copy paper is decided to be a longitudinal copy paper (YES at step S5554), the rotation angle is set at 0° or no rotation is performed (step S5555), otherwise the rotation angle is set at 270° (step S5556). On the other hand, if it is decided that the document is not fed along the longitudinal direction thereof (NO at step S5552), the order of the decoding of the first, second, third and fourth document images read is set as third, first, fourth and second document image (step S5557). Then, it is decided next if a copy paper is a longitudinal paper or not (step S5558). If the copy paper is decided to be a longitudinal copy paper (YES at step S5558), the rotation angle is set at 90° (step S5559), otherwise the rotation angle is set at 0° (step S5555). Then, the flow returns to the main flow.

If portrait mode is decided not to be set (NO at step S5551) or if landscape mode is set, it is decided next if a document is fed onto the platen 18 of the image reader along a longitudinal direction of the document (step S5560). If it is decided that the document is fed along the longitudinal direction thereof (YES at step S5560), the order of the decoding of first, second, third and fourth document images read by the image reader is set as third, first, fourth and second document image (step S5561). Then, it is decided next if a copy paper is a longitudinal paper or not (step S5562). If the copy paper is decided to be longitudinal (YES at step S5562), the rotation angle is set at 0° (step S5563), otherwise the rotation angle is set at 90° (step S5564). On the other hand, if it is decided that the document is not fed along the longitudinal direction thereof (NO at step S5560), the order of the decoding of first, second, third and fourth document images read by the image reader is set as first, second, third and fourth document image (step S5556). Then, it is decided next if a copy paper is a longitudinal paper or not (step S5567). If the copy paper is decided to be longitudinal (YES at step S5567), the rotation angle is set at 90° (step S5563), otherwise the rotation angle is set at 0° (step S5564). Then, the flow returns to the main flow.

Figure 19:
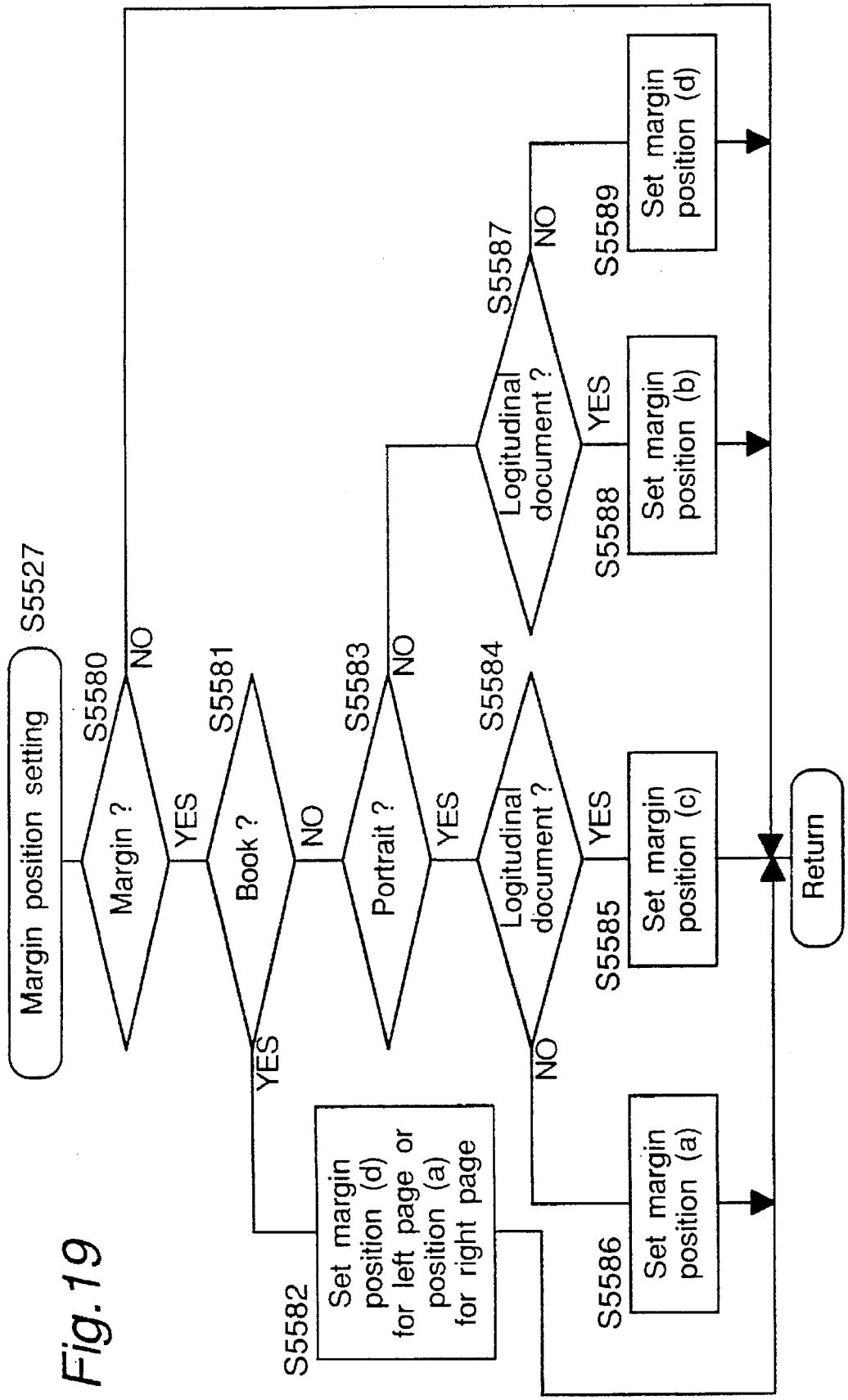
FIG. 19 is a flowchart of margin position setting.
Figure 20A:
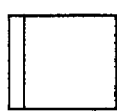
FIGS. 20A, 20B, 20C and 20D are plan views of documents with various margin positions.
Figure 20B:
Figure 20C:
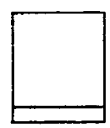
Figure 20D:
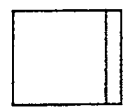
Figure 21:
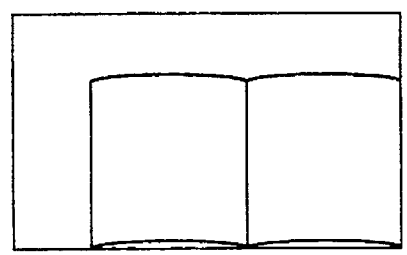
FIG. 21 is a diagram of a book placed on a platen.

FIG. 19 shows a flow of margin direction setting (step S5527 in FIG. 17C). First, it is checked if margin mode (for book, portrait document or landscape document) is set or not (step S5580). If margin mode is decided not to be set (NO at step S5580), the flow returns readily to the main routine. If margin mode is decided to be set (YES at step S5580), margin position is set according to a type of document. If the document is decided to be a book (YES at step S5581), the margin is set at a right position for a left page as shown in FIG. 20D and at a left position for a right page as shown in FIG. 20A (step S5582), in order to remove a shadow image generated at the center of the book. In other words, a document image of a book placed as shown in FIG. 21 is divided into two, or left and right pages, and the margin positions are set differently for the left and right pages. In two-face copy mode, the image of the left page is formed on the front face, while that of the right page is formed on the back face. Then, the flow returns to the main flow.

If the document is decided to be a portrait document (YES at step S5583), it is decided next if the document has been fed onto the platen 18 of the image reader along a longitudinal direction of the document (step S5584). If the document is decided to be fed along the longitudinal direction (YES at step S5584), the margin is set at bottom position as shown in FIG. 20C (step S5585), otherwise the margin is set at left position as shown in FIG. 20A (step S5586). Then, the flow returns to the main flow.

If the document is decided not to be a portrait document (NO at step S5583), or if it is a landscape document, it is decided next if the document has been fed onto the platen 18 of the image reader along a lontudinal direction of the document (step S5587). If the document is decided to be fed along the longitudinal direction (YES at step S5588), the margin is set at top position as shown in FIG. 20B (step S5588), otherwise the margin is set at right position as shown in FIG. 20D (step S5589). Then, the flow returns to the main flow.

Figure 22:
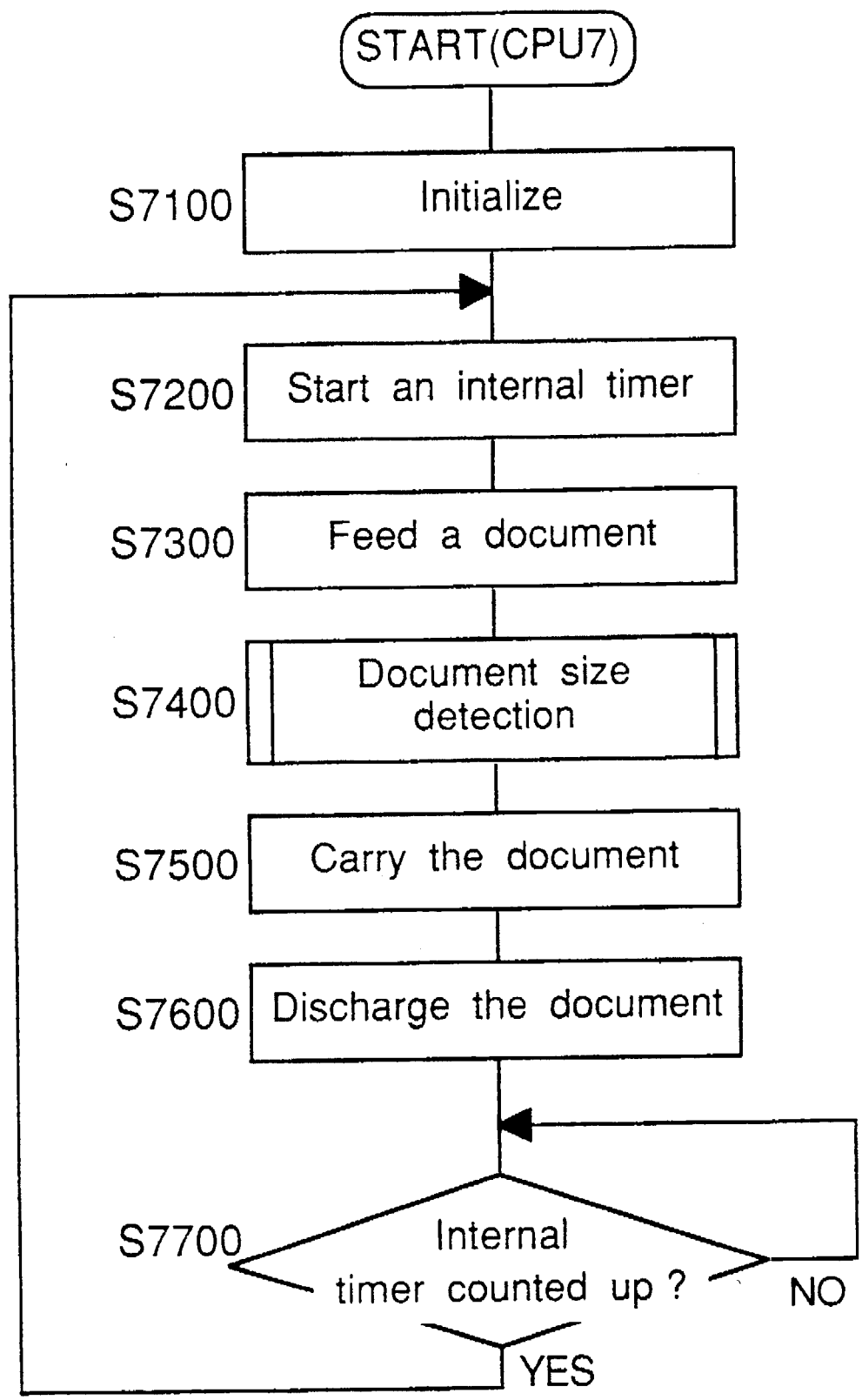
FIG. 22 is a main flowchart of the CPU 7 which controls an automatic document feeder.

FIG. 22 shows a main flow of the CPU 7 which controls the automatic document feeder 500. After initialization (step S7100), an internal timer is started for monitoring a time for one routine of this flow to keep it constant (step S7200). Then, a document is fed to the belt 506 (step S7300), and a document size is detected (step S7400). Then, the document is carried by the belt 506 to a predetermined position on the platen 18 (step S7500). After the document is read, the document is carried by the reverse roller 507 to be discharged or to be carried again onto the platen 18 according to copy mode (step S7600). Then, if the internal timer is counted up (YES at step S7700), the flow returns to step S7200.

Figure 23A:
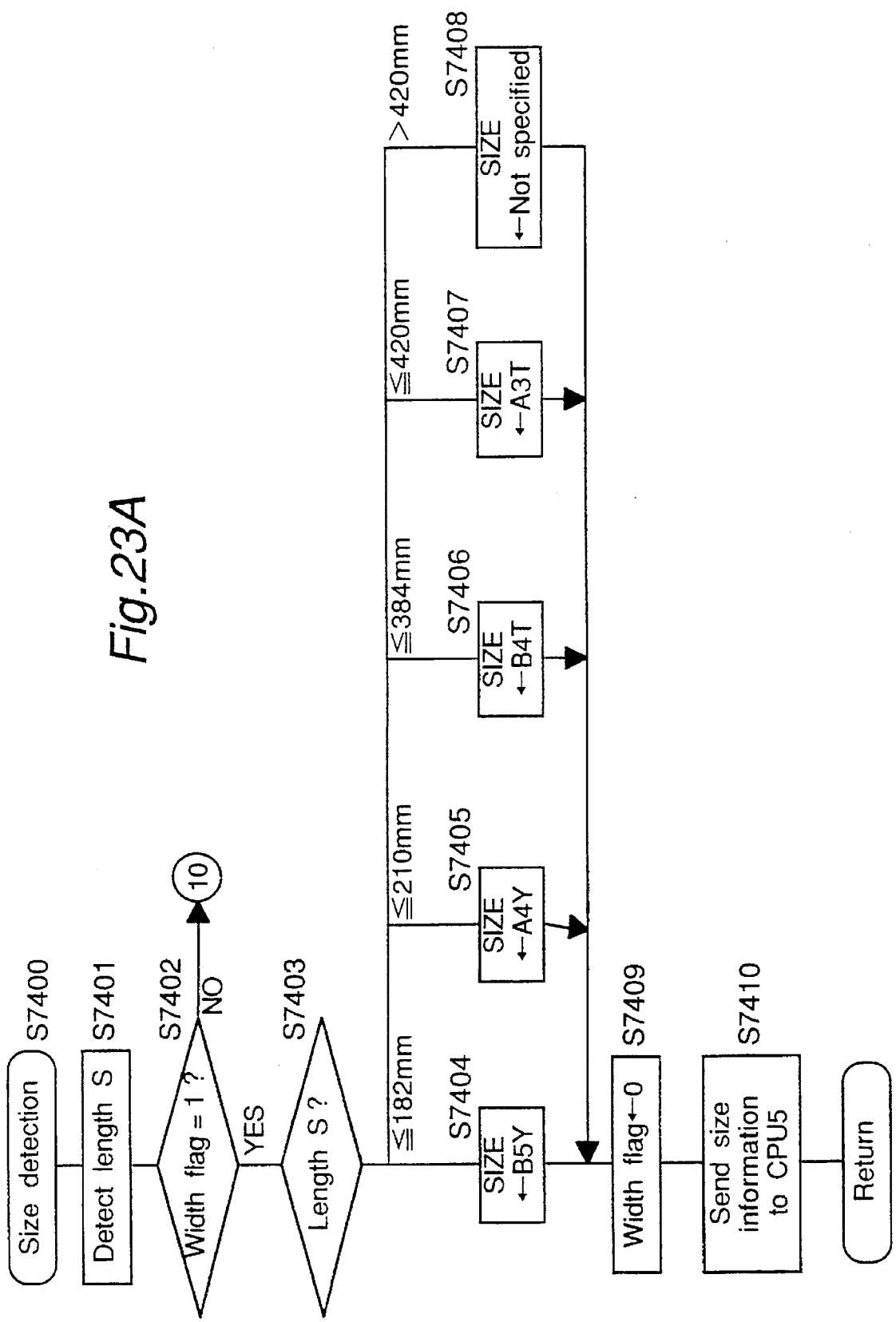
FIGS. 23A and 23B are a flowchart of size detection.
Figure 23B:
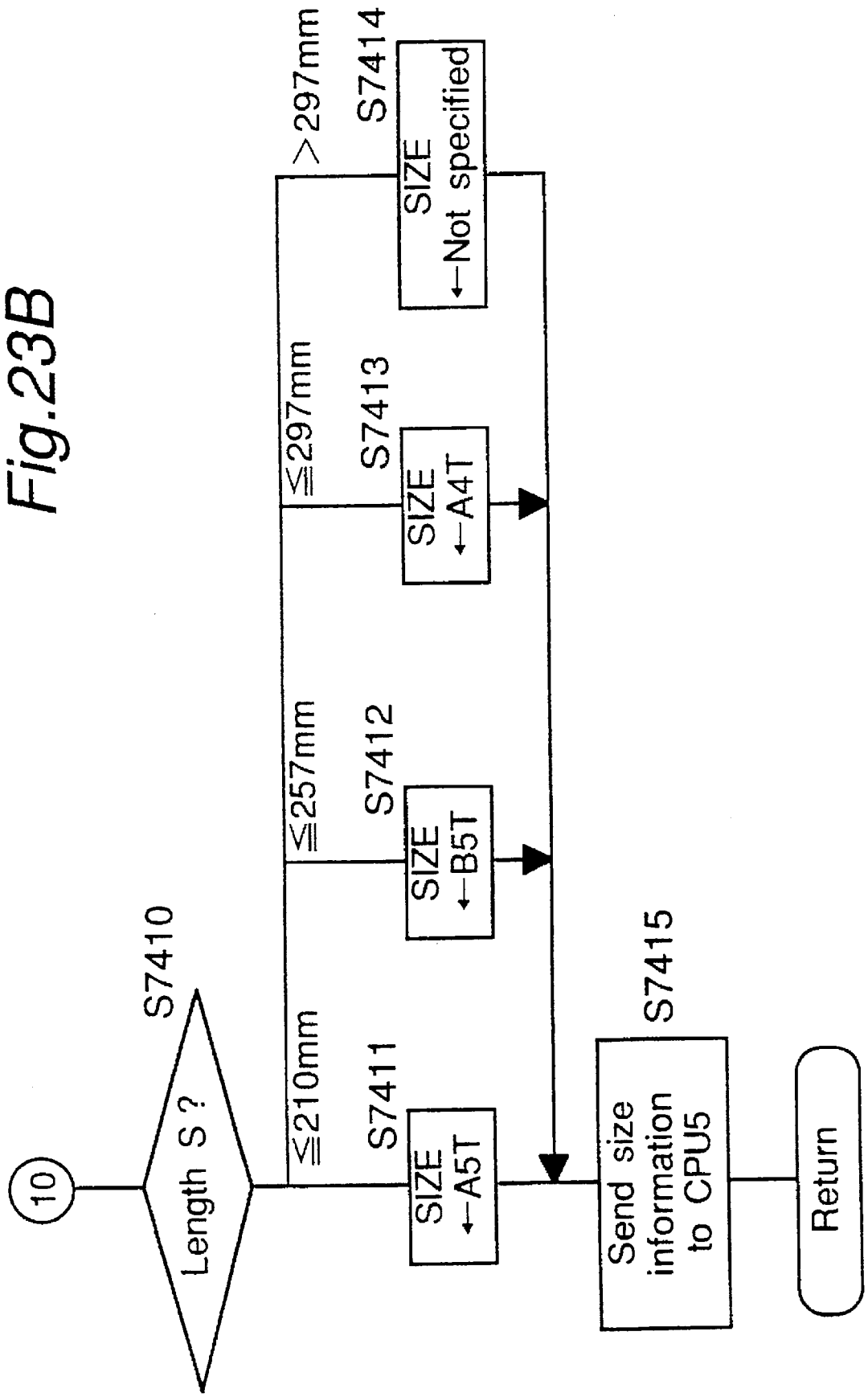

FIGS. 23A and 23B show a flow of size detection (step S7400 in FIG. 22). First, a document length S is measured with the sensors SE51 according to a time needed to feed a document over them (step S7401). The time is proportional to the document length S. Next, it is decided if the width flag is set to be "1" (step S7402). The sensors SE51 detect a document having a width larger than that of a B4 document carried laterally, and this sets the width flag as "1". The document size is determined by the length S and the width flag. In FIGS. 23A and 23B, "T" means a longitudinal direction for document feed, while "Y" means a lateral direction. If the width flag is decided to be set to be "1" (YES at step S7402), the flow branches according to length S (step S7403). That is, if the length S is 182 mm or less, the document size is determined as B5Y or B5 size fed laterally (step S7404). If the length S is above 182 mm and 210 mm or less, the document size is determined as A4Y or A4 size fed laterally (step S7405). If the length S is above 210 mm and 384 mm or less, the document size is determined as B4T or B4 size fed longitudinally (step S7406). If the length S exceeds above 384 mm and 420 mm or less, the document size is determined as A3Y or A3 size fed longitudinally (step S7407). If the length S is above 420 mm, the document size is determined not to be set (step S7408). Then, the width flag is set as "0" (step S7409), and the size data is sent to the CPU 5 (step S7401).

If the width flag is decided not to be set as "1" (NO at step S7402), the flow branches according to the document length S (step S7410). That is, if the length S is 210 mm or less, the document size is determined as A5T or A5 size fed longitudinally (step S7411). If the length S is above 210 mm and 257 mm or less, the document size is determined as B5T or B5 size fed longitudinally (step S7412). If the length S is above 257 mm and 297 mm or less, the document size is determined as A4T or A4 size fed longitudinally (step S7413). If the length S is above 297, the document size is determined not to be set (step S7414). Then, the size data is sent to the CPU 5 (step S7415).

In the above-mentioned embodiment, a document placed along the document feed direction as shown in FIG. 6A is decided as a landscape document. However, it may be decided as a portrait document.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image forming apparatus comprising:

an image reader for detecting an image of a document placed on a platen;

an image memory for storing image data detected by said image reader;

a document size sensor for detecting a size of the document;

a document type input means for specifying a document type by a user;

a document direction detection sensor for detecting a direction of the document on the platen;

a decision means for deciding a document type according to the document direction detected by said document direction detection sensor;

an image processing means for performing a prescribed processing according to the document type specified by said document type input means when the document size detected by said document size sensor allows the document to be placed on the platen only along a specified direction and according to the document type decided by said decision means when the document size detected by said document size sensor does not limit the document to be placed on the platen only along the specified direction; and an image forming means for forming an output image on a paper according to image data received by said image processor.

2. The image forming apparatus according to claim 1, wherein the document size detected by said document size sensor allows the document to be placed on the platen only along a specified direction when the document size is larger than a half of an image read area in the platen.

3. The image forming apparatus according to claim 1, wherein the document type specified by said document type input means and decided by said decision means is a portrait document or a landscape document.

4. The image forming apparatus according to claim 1, wherein the prescribed processing performed by said image processing means is a processing for providing a margin in the output image.

5. The image forming apparatus according to claim 4, wherein the margin is set at an end along a longitudinal direction of a sheet of paper on which an image is formed by said image forming means.

6. The image forming apparatus according to claim 1, wherein said image processing means performs the prescribed processing according to the document type specified by said document type input means even when the document size detected by said document size sensor does not limit the document to placed on the platen only along the specified direction, if the document type is specified by said document type input means.

7. The image forming apparatus according to claim 1, wherein the prescribed processing performed by said image processing means is a processing for rearranging page order in 4-in-1 mode where an order of document images of four pages in a synthesized image of the document images in one paper are rearranged according to the document type.

8. The image forming apparatus according to claim 1, further comprising a request means for requesting a user to specify the document type with said document type input means if the document size detected by said document size sensor allows the document to be placed on the platen only along the specified direction.

9. An image forming apparatus comprising:

an image reader for detecting an image of a document placed on a platen;

an image memory for storing image data detected by said image reader;

a document size sensor for detecting a size of the document;

a document type input means for specifying a document type by a user;

a document direction detection sensor for detecting a direction of the document on the platen;

a decision means for deciding the document type according to the document direction detected by said document direction detection sensor;

a request means for requesting a user to specify the document type with said document type input means if the document size detected by said document size sensor allows the document to placed on the platen only along a specified direction;

a first image processing means for performing a prescribed processing according to the document type specified by said document type input means if the document type is specified according to the request by said request means;

a second image processing means for performing a prescribed processing according to the document type decided by said decision means if the document size detected by said document size sensor does not limit the document to placed on the platen only along the specified direction; and an image forming means for forming an image on a paper according to image data received by said first or second image processing means.

10. The image forming apparatus according to claim 9, wherein the document type specified by said document type input means and decided by said decision means is a portrait document or a landscape document.

11. The image forming apparatus according to claim 9, wherein the prescribed processing performed by said image processing means is a processing for providing a margin.

12. The image forming apparatus according to claim 11, wherein a position of the margin is changed according to the document type.

13. The image forming apparatus according to claim 12, wherein the margin position for the portrait document is set at an end along a longitudinal direction of a sheet of paper on which an image is formed by said image forming means and the margin position for the landscape document is set at an end along a direction perpendicular to the longitudinal direction of the sheet of paper.

14. An image forming apparatus comprising:

an image reader for detecting an image of a document placed on a platen;

an image memory for storing image data detected by said image reader;

a document size sensor for detecting a size of the document;

a warning means for warning that the document size detected by said document size sensor is larger than a half of an image read region in the platen;

a document direction detection sensor for detecting a direction of the document on the platen;

a decision means for deciding a document type according to the document direction detected by said document direction detection sensor;

an image processing means for performing a prescribed processing according to the document type decided by said decision means; and an image forming means for forming an image on a paper according to image data received by said image processing means.

15. The image forming apparatus according to claim 14, wherein the document type specified by said document type input means and decided by said decision means is a portrait document or a landscape document.

16. The image forming apparatus according to claim 14, further comprising a document type input means for specifying a document type by a user; wherein said warning means warns a user to input the document type with the document type input means.

17. An image forming apparatus comprising:

an image reader for detecting an image of a document placed on a platen;

a first memory for storing image data detected by said image reader;

a document size sensor for detecting a size of the document;

a document direction detection means for detecting a direction of the document on the platen;

a document type input means for specifying a document type;

a second memory for storing the document type specified by said document type input means;

a write means for rewriting the document type stored in said second memory by deciding the document is a portrait or landscape document according to the document direction by said document direction detection means if the document size detected by said document size sensor allows the document to placed on the platen only along a specified direction;

an image processing means for performing a prescribed processing according to the document type stored in said second memory; and an image forming means for forming an image on a paper according to image data received by said image processing means.

18. The image forming apparatus according to claim 17, wherein the document type specified by said document type input means and decided by said decision means is a portrait document or a landscape document.

* * * * *